United States Patent [19]

Suga et al.

[11] Patent Number: 5,928,982
[45] Date of Patent: Jul. 27, 1999

[54] CATALYST FOR POLYMERIZING AN OLEFIN AND METHOD FOR POLYMERIZING THE OLEFIN

[75] Inventors: Yoshinori Suga, Yokohama; Yumito Uehara, Yokkaichi; Yasuo Maruyama; Eiji Isobe, both of Yokohama; Yoshiyuki Ishihama; Takehiro Sagae, both of Yokkaichi, all of Japan

[73] Assignee: Mitsubishi Chemical Corporation, Tokyo, Japan

[21] Appl. No.: 08/688,773

[22] Filed: Jul. 31, 1996

Related U.S. Application Data

[63] Continuation of application No. 08/443,160, May 17, 1995, abandoned.

[30] Foreign Application Priority Data

May 18, 1994 [JP] Japan .................................. 6-103815
Sep. 8, 1994 [JP] Japan .................................. 6-214751

[51] Int. Cl.$^6$ .............................. B01J 31/00; B01J 37/00; C08F 4/02; C08F 4/60
[52] U.S. Cl. ........................... 502/118; 502/81; 502/103; 502/104; 502/113; 502/117; 502/120; 502/121; 502/132; 526/126; 526/131
[58] Field of Search .............................. 502/81, 103, 104, 502/113, 117, 118, 120, 121, 132; 526/126, 131

[56] References Cited

U.S. PATENT DOCUMENTS

| | | | |
|---|---|---|---|
| 4,289,651 | 9/1981 | Benton et al. .......................... | 502/118 |
| 4,727,124 | 2/1988 | Konrad et al. .......................... | 502/121 |
| 5,308,811 | 5/1994 | Suga et al. .............................. | 502/118 |
| 5,470,812 | 11/1995 | Mink et al. ............................. | 502/120 |
| 5,514,634 | 5/1996 | Hagerty et al. ......................... | 502/120 |

*Primary Examiner*—Mark L. Bell
*Assistant Examiner*—J. Pasterczyk
*Attorney, Agent, or Firm*—Oblon, Spivak, McClelland, Maier & Neustadt, P.C.

[57] ABSTRACT

A catalyst for polymerizing an olefin, which comprises (A) a metallocene transition metal compound, (B) (1) an ion-exchanging layered compound other than a silicate or (2) an inorganic silicate prepared by treating a starting ion-exchanging layer compound other than a silicate or a starting silicate with a salt, an acid, or a combination thereof, said component (B) having a water content not higher than 1% by weight which is obtained by heat-dehydrating component (B) under an inert gas atmosphere or under reduced pressure, and (C) an organoaluminum compound.

15 Claims, No Drawings

CATALYST FOR POLYMERIZING AN OLEFIN AND METHOD FOR POLYMERIZING THE OLEFIN

This application is a Continuation of application Ser. No. 08/443,160, filed on May 17, 1995, now abandoned.

The present invention relates to a catalyst for polymerizing an olefin and a method for polymerizing the olefin. More particularly, the present invention relates to a polymerization catalyst which produces an olefin polymer at a high activity, and also relates to a method for polymerizing an olefin by using said catalyst.

It is known to produce an olefin polymer by polymerizing an olefin in the presence of a catalyst comprising (1) metallocene and (2) alumoxane (Japanese Patent Publication No. 12283/1992 and Japanese Patent Laid Open No. 35007/1985).

However, these catalyst systems are often soluble in reaction systems, and consequently they have problems in the production line that particle properties of olefin polymers obtained by slurry polymerization or gas phase polymerization are very poor. For example, the olefin polymers thus obtained have indefinite particle shapes and small bulk densities, and contain lots of fine powders. Also, the polymers thus obtained have relatively narrow molecular weight distributions, and therefore they are hardly moldable due to low melt tension when they are molded by various molding methods. Taking an ethylene type polymer for instance, draw-down occurs, and the thickness of the molded product is not uniform, and sometimes it is blown through when it is subjected to blow molding. Also, when an inflation film is molded at a high speed, a bubble is broken or unstable, and when it is molded by T-die molding, the skin of the molded product becomes rough and neck-in tends to occur.

On the other hand, in order to solve the above-mentioned problems, a method has been proposed wherein polymerization of an olefin is conducted by using a catalyst which one or both of a transition metal compound and an organoaluminum compound is supported on an inorganic oxide, such as silica or alumina, or an organic material (Japanese Patent Laid Open No. 35007/1985, No. 31404/1986, No. 108610/1986, No. 276805/1986 and No. 296008/1986).

However, the polymers obtained by these methods contain lots of fine powders and coarse particles, and have low bulk densities, thus providing poor particle properties and in addition providing new problem such as a low polymerization activity per solid component. Further, there have been reported a catalyst for polymerization of an olefin which comprises a metallocene compound and an alumoxane supported on smectite (Japanese Patent Laid Open No. 25214/1993) and a catalyst for polymerizing an olefin by using an alumoxane, a metallocene compound and a layered clay mineral which has been treated with a metal oxide or a precursor of a metal oxide and then calcined in the presence of oxygen (Japanese Patent Laid Open No. 33814/1995).

Recently, various polymerization methods of olefins have been proposed for improving the above-mentioned molding properties. For example, Japanese Patent Laid Open No. 213306/1992 proposes a method for polymerizing ethylene and α-olefin in the presence of a catalyst system comprising (1) a transition metal compound having a structure, as a ligand, crosslinked with at least two groups having cyclopentadienyl structure by means of a carbon and/or silicon-containing group and (2) an alumoxane as an organic metal component, as the essential components. However, the copolymer obtained by the above-mentioned method is still unsatisfactory although the above-mentioned molding properties are somewhat improved.

In order to solve these problems, the present inventors have previously proposed a method of using a specific solid component (Japanese Patent Laid Open No. 301917/1993). However, this method is not always satisfactory in respect of polymerization activity per solid component.

The present inventors have conducted extensive studies to solve the above problems, and accomplished the present invention. Thus, the present invention resides in a catalyst for polymerizing an olefin, which comprises, as the essential components, (A) a metallocene-type transition metal compound and (B) at least one member selected from the group consisting of (1) an ion-exchanging layered compound other than a silicate and (2) an inorganic silicate, which is obtained by salt-treatment and/or acid-treatment and which has a water content of not higher than 3% by weight, and also resides in a method for polymerizing an olefin, which comprises homopolymerizing or copolymerizing an olefin in the presence of said catalyst.

Now, the present invention will be described in further details hereinafter (the atoms described herein are defined by the Periodic Table employing 18 Group system defined by IUPAC in 1989).

The metallocene-type transition metal compound of component (A) to be used in the catalyst of the present invention, is an organometallic compound or a cation-type complex thereof, composed of (i) one or two cyclopentadienyl-type ligands which may be substituted, i.e. one or two cyclopentadienyl ring-containing ligands wherein substituents may bond to form a fused ring, and (ii) a transition metal of Group 3, 4, 5 or 6 of the Periodic Table.

Preferred as such a metallocene-type transition metal compound of component (A) is a compound of the following formula (1) or (2):

$$(C_5R^1{}_aH_{5-a})_p(C_5R^2{}_bH_{5-b})_qMR^3{}_r \qquad (1)$$

$$[(C_5R^1{}_aH_{5-a})_p(C_5R^2{}_bH_{5-b})_qMR^3{}_rL_m]^{n+}[R^4]^{n-} \qquad (2),$$

wherein $C_5R^1{}_aH_{5-a}$ and $C_5R^2{}_bH_{5-b}$ are cyclopentadienyl group derivatives.

In the formula (1) or (2), each of $R^1$ and $R^2$ which may be the same or different, is a $C_{1-20}$ hydrocarbon group which may be substituted, a silicon-containing group, a phosphorus-containing group, a nitrogen-containing group or an oxygen-containing group.

Examples of $R^1$ and $R^2$ groups include an alkyl group such as methyl, ethyl, propyl, isopropyl, butyl, isobutyl, t-butyl, pentyl, isopentyl, hexyl, heptyl, octyl, nonyl or decyl; an aryl group such as phenyl, p-tolyl, o-tolyl or m-tolyl; a halo-substituted hydrocarbon group such as fluoromethyl, fluoroethyl, fluorophenyl, chloromethyl, chloroethyl, chlorophenyl, bromomethyl, bromoethyl, bromophenyl, iodomethyl, iodoethyl or iodophenyl; a silicon-containing substituent such as trimethylsilyl, triethylsilyl or triphenylsilyl; an alkoxy group such as methoxy, ethoxy, propoxy, isopropoxy, butoxy, isobutoxy or t-butoxy; an aryloxy group such as phenoxy, methylphenoxy, pentamethylphenoxy, p-tolyloxy, m-tolyloxy or o-tolyloxy; and the like. Among them, preferable examples include a $C_{1-4}$ alkyl group such as methyl, ethyl, propyl, isopropyl, butyl, isobutyl or t-butyl; a silicon-containing substituent such as trimethylsilyl; an alkoxy group such as methoxy; and an aryloxy group such as phenoxy.

Further, $R^1$ and $R^2$ may bond each other to form a crosslinking group.

Specifically, it may be an alkylene group such as methylene or ethylene; an alkylidene group such as ethylidene, propylidene, isopropylidene, phenylmethylidene or diphenylmethylidene; a silicon-containing crosslinking group such as dimethylsilylene, diethylsilylene, dipropylsilylene, diisopropylsilylene, diphenylsilylene, methylethylsilylene, methylphenylsilylene, methylisopropylsilylene or methyl-t-tutylsilylene; a germanium-containing crosslinking group such as dimethylgermilene, diethylgermilene, dipropylgermilene, diisopropylgermilene, diphenylgermilene, methylethylgermilene, methylphenylgermilene, methylisopropylgermilene or methyl-t-butylgermilene; an amino group; or a phosphinyl group.

Still further, $R^1$ and $R^1$, or $R^2$ and $R^2$ may respectively bond each other to form a ring. Preferable examples include an indenyl group, a tetrahydroindenyl group, a fluorenyl group, an octahydrofluorenyl group and the like, which may be substituted.

Examples of a $R^3$ group include a $C_{1-20}$ hydrocarbon group which may be substituted, hydrogen, a halogen, a silicon-containing substituent, an alkoxy group, an aryloxy group, an amide group or a thioalkoxy group. Specific examples include an alkyl group such as methyl, ethyl, propyl, isopropyl, butyl, isobutyl, t-butyl, pentyl, isopentyl, hexyl, heptyl, octyl, nonyl or decyl; an aryl group such as phenyl, p-tolyl, o-tolyl or m-tolyl; a halo-substituted hydrocarbon group such as fluoromethyl, fluoroethyl, fluorophenyl, chloromethyl, chloroethyl, chlorophenyl, bromomethyl, bromoethyl, bromophenyl, iodomethyl, iodoethyl or iodophenyl; a halogen atom such as fluorine, chlorine, bromine or iodine; a silicon-containing substituent such as trimethylsilyl, triethylsilyl or triphenylsilyl; an alkoxy group such as methoxy, ethoxy, propoxy, isopropoxy, butoxy, isobutoxy or t-butoxy; an aryloxy group such as phenoxy, methylphenoxy, pentamethylphenoxy, p-tolyloxy, m-tolyloxy or o-tolyloxy; an amide group such as dimethylamide, diethylamide, dipropylamide, diisopropylamide, ethyl-t-butylamide or bis(trimethylsilyl) amide; and a thioalkoxy group such as methylthioalkoxy, ethylthioalkoxy, propylthioalkoxy, butylthioalkoxy, t-butylthioalkoxy or phenylthioalkoxy. Preferable examples include hydrogen, a methyl group, an ethyl group, a propyl group, an isopropyl group, a butyl group, a phenyl group, a halogen atom such as chlorine, a methoxy group, an ethoxy group, a propoxy group, an isopropoxy group, a dimethylamide group or a methylthioalkoxy group, and more preferable examples include hydrogen, a methyl group or chlorine.

Further, $R^3$ may bond with $R^1$, $R^2$ or Cp, and examples of such a ligand include $C_5H_4(CH_2)_nO-$ ($1 \leq n \leq 5$), $C_5Me_4(CH_2)_nO-$ ($1 \leq n \leq 5$), $C_5H_4(Me_2Si)$ (t-Bu)N— and $C_5H_4(Me_4(Me_2Si)$ (t-Bu)N—, wherein Me is methyl and Bu is butyl.

Still further, $R^3$ may bond each other to form a bidentate ligand, examples of which include —OCH$_2$O—, —OCH$_2$CH$_2$O— and —O(o—C$_6$H$_4$)O—.

M is an atom of Group 3, 4, 5 or 6 of the Periodic Table, examples of which include scandium, yttrium, lanthanum, cerium, praseodymium, neodymium, samarium, europium, gadolinium, terbium, dysprosium, holmium, erbium, thulium, ytterbium, lutetium, actinium, thorium, protactinium, uranium, titanium, zirconium, hafnium, vanadium, niobium, tantalum, chromium, molybdenum and tungsten. Preferable examples include Group 4 atoms such as titanium, zirconium and hafnium. They may be used in a mixture.

L is an electrically neutral ligand, and m is its number and is an integer of 0 or more. Examples include ethers such as diethyl ether, tetrahydrofuran or dioxane; nitriles such as acetonitrile; amides such as dimethylformamide; phosphines such as trimethylphosphine; amines such as trimethylamine; and the like. Preferable examples include tetrahydrofuran, trimethylphosphine or trimethylamine.

$[R^4]^{n-}$ is one or two or more anion to neutralize a cation, and examples include tetraphenyl borate, tetra(p-tolyl) borate, carbadodecaborate, dicarbaundecaborate, tetrakis (pentafluorophenyl)borate, tetrafluoroborate, hexafluorophosphate and the like. Preferable examples include tetraphenyl borate, tetra(p-tolyl)borate, tetrafluoroborate or hexafluorophosphate. a and b are respectively integers of from 0 to 5. Also, p, q and r are 0 or positive integers which satisfy the equation, p+q+r=V (V=the valence of M), in case that the metallocene-type transition metal compound is a compound of the formula (1), or p, q and r are 0 or positive integers which satisfy the equation, p+q+r=V-n, in case that the metallocene-type transition metal compound is a compound of the formula (2). Usually, p and q are integers of from 0 to 3, preferably 0 or 1, and r is an integer of from 0 to 3, preferably 1 or 2. n is an integer to satisfy $0 \leq n \leq V$.

The catalyst of the present invention is capable of producing any one of an isotactic polymer, a syndiotactic polymer and an atactic polymer.

Taking zirconium as an example, specific examples of the above metallocene-type transition metal compound corresponding to the formula (1) include bis (methylcyclopentadienyl)zirconium dichloride, bis (ethylcyclopentadienyl)zirconium dichloride, bis (methylcyclopentadienyl)zirconium dimethyl, bis (ethylcyclopentadienyl)zirconium dimethyl, bis (methylcyclopentadienyl)zirconium dihydride, bis (ethylcyclopentadienyl)zirconium dihydride, bis (dimethylcyclopentadienyl)zirconium dichloride, bis (trimethylcyclopentadienyl)zirconium dichloride, bis (tetramethylcyclopentadienyl)zirconium dichloride, bis (ethyltetramethylcyclopentadienyl)zirconium dichloride, bis (indenyl)zirconium dichloride, bis (dimethylcyclopentadienyl)zirconium dimethyl, bis (trimethylcyclopentadienyl)zirconium dimethyl, bis (tetramethylcyclopentadienyl)zirconium dimethyl, bis (ethyltetramethylcyclopentadienyl)zirconium dimethyl, bis (indenyl)zirconium dimethyl, bis (dimethylcyclopentadienyl)zirconium dihydride, bis (trimethylcyclopentadienyl)zirconium dihydride, bis (ethyltetramethylcyclopentadienyl)zirconium dihydride, bis (trimethylsilylcyclopentadienyl)zirconium dimethyl, bis (trimethylsilylcyclopentadienyl)zirconium dihydride, bis (trifluoromethylcyclopentadienyl)zirconium dichloride, bis (trifluoromethylcyclopentadienyl)zirconium dimethyl, bis (trifluoromethylcyclopentadienyl)zirconium dihydride, isopropylidenebis(indenyl)zirconium dichloride, isopropylidenebis(indenyl)zirconium dimethyl, isopropylidenebis(indenyl)zirconium dihydride, pentamethylcyclopentadienyl(cyclopentadienyl)zirconium dichloride, pentamethylcyclopentadienyl(cyclopentadienyl) zirconium dimethyl, pentamethylcyclopentadienyl (cyclopentadienyl)zirconium dihydride, ethyltetramethylcyclopentadienyl(cyclopentadienyl) zirconium dihydride, isopropylidene(cyclopentadienyl) (fluorenyl)zirconium dichloride, isopropylidene (cyclopentadienyl)(fluorenyl)zirconium dimethyl, dimethylsilyl(cyclopentadienyl)(fluorenyl)zirconium dimethyl, isopropylidene(cyclopentadienyl)(fluorenyl) zirconium dihydride, bis(cyclopentadienyl)zirconium dichloride, bis(cyclopentadienyl)zirconium dimethyl, bis (cyclopentadienyl)zirconium diethyl, bis(cyclopentadienyl) zirconium dipropyl, bis(cyclopentadienyl)zirconium diphenyl, methylcyclopentadienyl(cyclopentadienyl) zirconium dichloride, ethylcyclopentadienyl (cyclopentadienyl)zirconium dichloride, methylcyclopentadienyl(cyclopentadienyl)zirconium dimethyl, ethylcyclopentadienyl(cyclopentadienyl) zirconium dimethyl, methylcyclopentadienyl (cyclopentadienyl)zirconium dihydride, ethylcyclopentadienyl(cyclopentadienyl)zirconium dihydride, dimethylcyclopentadienyl(cyclopentadienyl) zirconium dichloride, trimethylcyclopentadienyl (cyclopentadienyl)zirconium dichloride, tetramethylcyclopentadienyl(cyclopentadienyl)zirconium dichloride, bis(pentamethylcyclopentadienyl)zirconium dichloride, tetramethylcyclopentadienyl(cyclopentadienyl) zirconium dichloride, indenyl(cyclopentadienyl)zirconium dichloride, dimethylcyclopentadienyl(cyclopentadienyl) zirconium dimethyl, trimethylcyclopentadienyl (cyclopentadienyl)zirconium dimethyl, tetramethylcyclopentadienyl(cyclopentadienyl)zirconium dimethyl, bis(pentamethylcyclopentadienyl)zirconium dimethyl, ethyltetramethylcyclopentadienyl (cyclopentadienyl)zirconium dimethyl, indenyl (cyclopentadienyl)zirconium dimethyl, dimethylcyclopentadienyl(cyclopentadienyl)zirconium dihydride, trimethylcyclopentadienyl(cyclopentadienyl) zirconium dihydride, bis(pentamethylcyclopentadienyl) zirconium dihydride, indenyl(cyclopentadienyl)zirconium dihydride, trimethylsilylcyclopentadienyl(cyclopentadienyl) zirconium dimethyl, trimethylsilylcyclopentadienyl (cyclopentadienyl)zirconium dihydride, trifluoromethylcyclopentadienyl(cyclopentadienyl) zirconium dichloride, trifluoromethylcyclopentadienyl (cyclopentadienyl)zirconium dimethyl, trifluoromethylcyclopentadienyl(cyclopentadienyl) zirconium dihydride, bis(cyclopentadienyl)(trimethylsilyl) (methyl)zirconium, bis(cyclopentadienyl)(triphenylsilyl) (methyl)zirconium, bis(cyclopentadienyl)[tris (dimethylsilyl)silyl](methyl)zirconium, bis (cyclopentadienyl)[bis(methylsilyl)silyl](methyl)zirconium, bis(cyclopentadienyl)(trimethylsilyl)(trimethylsilylmethyl) zirconium, bis(cyclopentadienyl)(trimethylsilyl)(benzyl) zirconium, methylenebis(cyclopentadienyl)zirconium dichloride, ethylenebis(cyclopentadienyl)zirconium dichloride, isopropylidenebis(cyclopentadienyl)zirconium dichloride, dimethylsilylbis(cyclopentadienyl)zirconium dichloride, methylenebis(cyclopentadienyl)zirconium dimethyl, ethylenebis(cyclopentadienyl)zirconium dimethyl, isopropylidenebis(cyclopentadienyl)zirconium dimethyl, dimethylsilylbis(cyclopentadienyl)zirconium dimethyl, methylenebis(cyclopentadienyl)zirconium dihydride, ethylenebis(cyclopentadienyl)zirconium dihydride, isopropylidenebis(cyclopentadienyl)zirconium dihydride, dimethylsilylbis(cyclopentadienyl)zirconium dihydride, bis(cyclopentadienyl)zirconiumbis (methanesulfonate), bis(cyclopentadienyl)zirconiumbis(p-toluenesulfonate), bis(cyclopentadienyl)zirconiumbis (trifluoromethanesulfonate), bis(cyclopentadienyl) zirconiumtrifluoromethanesulfonate chloride, bis (cyclopentadienyl)zirconiumbis(benzenesulfonate), bis (cyclopentadienyl)zirconiumbis (pentafluorobenzenesulfonate), bis(cyclopentadienyl) zirconiumbenzenesulfonate chloride, bis(cyclopentadienyl) zirconium(ethoxy)trifluoromethanesulfonate, bis (tetramethylcyclopentadienyl)zirconiumbis (trifluoromethanesulfonate), bis(indenyl)zirconiumbis (trifluoromethanesulfonate), ethylenebis(indenyl) zirconiumbis(trifluoromethanesulfonate), isopropylidenebis (indenyl)zirconiumbis(trifluoromethanesulfonate), (t-butylamide)dimethyl(tetramethylcyclopentadienyl) silanedibenzylzirconium, (t-butylamide)dimethyl(2,3,4,5-tetramethylcyclopentadienyl)silanedibenzylzirconium, indenylzirconiumtris(dimethylamide), indenylzirconiumtris (diethylamide), indenylzirconiumtris(di-n-propylamide), cyclopentadienylzirconiumtris(dimethylamide), methylcyclopentadienylzirconiumtris(dimethylamide), (t-butylamide)(tetramethylcyclopentadienyl)-1,2-ethanediylzirconium dichloride, (methylamide) (tetramethylcyclopentadienyl)-1,2-ethanediylzirconium dichloride, (ethylamide)(tetramethylcyclopentadienyl) methylenezirconium dichloride, (t-butylamide)dimethyl (tetramethylcyclopentadienyl)silanezirconium dichloride, (benzylamide)dimethyl(tetramethylcyclopentadienyl) silanezirconium dichloride, (phenylphosphide)dimethyl (tetramethylcyclopentadienyl)silanezirconium dibenzyl, (phenylamide)dimethyl(tetramethylcyclopentadienyl) silanezirconium dichloride, (2-methoxyphenylamide) dimethyl-(tetramethylcyclopentadienyl) silanezirconiumdichloride, (4-fluorophenylamide)dimethyl (tetramethylcyclopentadienyl)silanezirconium dichloride, ((2,6-di(1-methylethyl)phenyl)amide)dimethyl tetramethylcyclopentadienyl)amidezirconium dichloride, and the like.

Further, those corresponding to the formula (2) include a bis(methylcyclopentadienyl)zirconium(chloride) (tetraphenylborate)tetrahydrofuran complex, a bis (ethylcyclopentadienyl)zirconium(chloride) (tetraphenylborate)tetrahydrofuran complex, a bis (methylcyclopentadienyl)zirconium(methyl) (tetraphenylborate)tetrahydrofuran complex, a bis (ethylcyclopentadienyl)zirconium(methyl) (tetraphenylborate)tetrahydrofuran complex, a bis (methylcyclopentadienyl)zirconium(hydride) (tetraphenylborate)tetrahydrofuran complex, a bis (ethylcyclopentadienyl)zirconium(hydride) (tetraphenylborate)tetrahydrofuran complex, a bis (dimethylcyclopentadienyl)zirconium(chloride) (tetraphenylborate)tetrahydrofuran complex, a bis (trimethylcyclopentadienyl)zirconium(chloride) (tetraphenylborate)tetrahydrofuran complex, a bis (tetramethylcyclopentadienyl)zirconium(chloride) (tetraphenylborate)tetrahydrofuran complex, a bis (ethyltetramethylcyclopentadienyl)zirconium(chloride) (tetraphenylborate)tetrahydrofuran complex, a bis(indenyl) zirconium(chloride)(tetraphenylborate)tetrahydrofuran complex, a bis(dimethylcyclopentadienyl)zirconium (methyl)(tetraphenylborate)tetrahydrofuran complex, a bis (trimethylcyclopentadienyl)zirconium(methyl) (tetraphenylborate)tetrahydrofuran complex, a bis (tetramethylcyclopentadienyl)zirconium(methyl) (tetraphenylborate)tetrahydrofuran complex, a bis (ethyltetramethylcyclopentadienyl)zirconium(methyl) (tetraphenylborate)tetrahydrofuran complex, a bis(indenyl) zirconium(methyl)(tetraphenylborate)tetrahydrofuran complex, a bis(dimethylcyclopentadienyl)zirconium (hydride)(tetraphenylborate)tetrahydrofuran complex, a bis (trimethylcyclopentadienyl)zirconium(hydride) (tetraphenylborate)tetrahydrofuran complex, a bis (ethyltetramethylcyclopentadienyl)zirconium(hydride) (tetraphenylborate)tetrahydrofuran complex, a bis (trimethylsilylcyclopentadienyl)zirconium(methyl) (tetraphenylborate)tetrahydrofuran complex, a bis (trimethylsilylcyclopentadienyl)zirconium(hydride) (tetraphenylborate)tetrahydrofuran complex, a bis (trifluoromethylcyclopentadienyl)zirconium(methyl)

(tetraphenylborate)tetrahydrofuran complex, a bis (trifluoromethylcyclopentadienyl)zirconium(hydride) (tetraphenylborate)tetrahydrofuran complex, an isopropylidenebis(indenyl)zirconium(chloride) (tetraphenylborate)tetrahydrofuran complex, an isopropylidenebis(indenyl)zirconium(methyl) (tetraphenylborate)tetrahydrofuran complex, an isopropylidenebis(indenyl)zirconium(hydride) (tetraphenylborate)tetrahydrofuran complex, a pentamethylcyclopentadienyl(cyclopentadienyl)zirconium (chloride)(tetraphenylborate)tetrahydrofuran complex, an ethyltetramethylcyclopentadienyl(cyclopentadienyl) zirconium(chloride)(tetraphenylborate)tetrahydrofuran complex, a pentamethylcyclopentadienyl(cyclopentadienyl) zirconium(methyl)(tetraphenylborate)tetrahydrofuran complex, an ethyltetramethylcyclopentadienyl (cyclopentadienyl)zirconium(methyl)(tetraphenylborate) tetrahydrofuran complex, a pentamethylcyclopentadienyl (cyclopentadienyl)zirconium(hydride)(tetraphenylborate) tetrahydrofuran complex, an ethyltetramethylcyclopentadienyl(cyclopentadienyl) zirconium(hydride)(tetraphenylborate)tetrahydrofuran complex, an isopropylidene(cyclopentadienyl)(fluorenyl) zirconium(chloride)(tetraphenylborate)tetrahydrofuran complex, an isopropylidene(cyclopentadienyl)(fluorenyl) zirconium(methyl)(tetraphenylborate)tetrahydrofuran complex, an isopropylidene(cyclopentadienyl)(fluorenyl) zirconium(hydride)(tetraphenylborate)tetrahydrofuran complex, a bis(cyclopentadienyl)zirconium(chloride) (tetraphenylborate)tetrahydrofuran complex, a bis (cyclopentadienyl)(methyl)zirconium(tetraphenylborate) tetrahydrofuran complex, a bis(cyclopentadienyl)(ethyl) zirconium(tetraphenylborate)tetrahydrofuran complex, a bis (cyclopentadienyl)(propyl)zirconium(tetraphenylborate) tetrahydrofuran complex, a bis(cyclopentadienyl)(phenyl) zirconium(tetraphenylborate)tetrahydrofuran complex, a methylcyclopentadienyl(cyclopentadienyl)zirconium (chloride)(tetraphenylborate)tetrahydrofuran complex, an ethylcyclopentadienyl(cyclopentadienyl)zirconium (chloride)(tetraphenylborate)tetrahydrofuran complex, a bis (ethylcyclopentadienyl)zirconium(chloride) (tetraphenylborate)tetrahydrofuran complex, a methylcyclopentadienyl(cyclopentadienyl)zirconium (methyl)(tetraphenylborate)tetrahydrofuran complex, an ethylcyclopentadienyl(cyclopentadienyl)zirconium(methyl) (tetraphenylborate)tetrahydrofuran complex, a methylcyclopentadienyl(cyclopentadienyl)zirconium (hydride)(tetraphenylborate)tetrahydrofuran complex, an ethylcyclopentadienyl(cyclopentadienyl)zirconium (hydride)(tetraphenylborate)tetrahydrofuran complex, a dimethylcyclopentadienyl(cyclopentadienyl)zirconium (chloride)(tetraphenylborate)tetrahydrofuran complex, a trimethylcyclopentadienyl(cyclopentadienyl)zirconium (chloride)(tetraphenylborate)tetrahydrofuran complex, a tetramethylcyclopentadienyl(cyclopentadienyl)zirconium (chloride)(tetraphenylborate)tetrahydrofuran complex, a bis (pentamethylcyclopentadienyl)zirconium(chloride) (tetraphenylborate)tetrahydrofuran complex, an indenyl (cyclopentadienyl)zirconium(chloride)(tetraphenylborate) tetrahydrofuran complex, a dimethylcyclopentadienyl (cyclopentadienyl)zirconium(methyl)(tetraphenylborate) tetrahydrofuran complex, a trimethylcyclopentadienyl (cyclopentadienyl)zirconium(methyl)(tetraphenylborate) tetrahydrofuran complex, a tetramethylcyclopentadienyl (cyclopentadienyl)zirconium(methyl)(tetraphenylborate) tetrahydrofuran complex, a bis (pentamethylcyclopentadienyl)zirconium(methyl) (tetraphenylborate)tetrahydrofuran complex, a cyclopentadienyl(indenyl)zirconium(methyl) (tetraphenylborate)tetrahydrofuran complex, a dimethylcyclopentadienyl(cyclopentadienyl)zirconium (hydride)(tetraphenylborate)tetrahydrofuran complex, a trimethylcyclopentadienyl(cyclopentadienyl)zirconium (hydride)(tetraphenylborate)tetrahydrofuran complex, a bis (pentamethylcyclopentadienyl)zirconium(hydride) (tetraphenylborate)tetrahydrofuran complex, an indenyl (cyclopentadienyl)zirconium(hydride)(tetraphenylborate) tetrahydrofuran complex, a trimethylsilylcyclopentadienyl (cyclopentadienyl)zirconium(methyl)(tetraphenylborate) tetrahydrofuran complex, a trimethylsilylcyclopentadienyl (cyclopentadienyl)zirconium(hydride)(tetraphenylborate) tetrahydrofuran complex, a trifluoromethylcyclopentadienyl (cyclopentadienyl)zirconium(hydride)(tetraphenylborate) tetrahydrofuran complex, a bis(cyclopentadienyl) (trimethylsilyl)zirconium(tetraphenylborate)tetrahydrofuran complex, a bis(cyclopentadienyl)(triphenylsilyl)zirconium (tetraphenylborate)tetrahydrofuran complex, a bis (cyclopentadienyl)[tris(trimethylsilyl)silyl]-zirconium (tetraphenylborate)tetrahydrofuran complex, a bis (cyclopentadienyl)(trimethylsilylmethyl)zirconium (tetraphenylborate)tetrahydrofuran complex, a bis (cyclopentadienyl)(benzyl)zirconium(tetraphenylborate) tetrahydrofuran complex, a methylenebis(cyclopentadienyl) zirconium(chloride)(tetraphenylborate)tetrahydrofuran complex, an ethylenebis(cyclopentadienyl)zirconium (chloride)(tetraphenylborate)tetrahydrofuran complex, an isopropylidenebis(cyclopentadienyl)zirconium(chloride) (tetraphenylborate)tetrahydrofuran complex, a dimethylsilylbis(cyclopentadienyl)zirconium(chloride) (tetraphenylborate)tetrahydrofuran complex, a methylenebis (cyclopentadienyl)zirconium(methyl)(tetraphenylborate) tetrahydrofuran complex, an ethylenebis (cyclopentadienyl) zirconium(methyl)(tetraphenylborate)tetrahydrofuran complex, an isopropylidenebis(cyclopentadienyl)zirconium (methyl)(tetraphenylborate)tetrahydrofuran complex, a dimethylsilylbis(cyclopentadienyl)zirconium(methyl) (tetraphenylborate)tetrahydrofuran complex, a methylenebis (cyclopentadienyl)zirconium(hydride)(tetraphenylborate) tetrahydrofuran complex, an ethylenebis(cyclopentadienyl) zirconium(hydride)(tetraphenylborate)tetrahydrofuran complex, an isopropylidenebis(cyclopentadienyl)zirconium (hydride) tetraphenylborate)tetrahydrofuran complex, a dimethylsilylbis(cyclopentadienyl)zirconium(hydride) (tetraphenylborate)tetrahydrofuran complex, a bis (cyclopentadienyl)zirconium(methanesulfonate) (tetraphenylborate)tetrahydrofuran complex, a bis (cyclopentadienyl)zirconium(p-toluenesulfonate) (tetraphenylborate)tetrahydrofuran complex, a bis (cyclopentadienyl)zirconium(trifluoromethanesulfonate) (tetraphenylborate)tetrahydrofuran complex, a bis (cyclopentadienyl)zirconium(benzenesulfonate) (tetraphenylborate)tetrahydrofuran complex, a bis (cyclopentadienyl)zirconium(pentafluorobenzenesulfonate) (tetraphenylborate)tetrahydrofuran complex, a bis (tetramethylcyclopentadienyl)zirconium (trifluoromethanesulfonate)(tetraphenylborate) tetrahydrofuran complex, a bis(indenyl)zirconium (trifluoromethanesulfonate)(tetraphenylborate) tetrahydrofuran complex, an ethylenebis(indenyl)zirconium (trifluoromethanesulfonate)(tetraphenylborate) tetrahydrofuran complex, an isopropylidenebis(indenyl) zirconium(trifluoromethanesulfonate)(tetraphenylborate) tetrahydrofuran complex, and the like.

Further, with respect to compounds of other metals of Groups 3, 4, 5 and 6, such as titanium compounds and hafnium compounds, those equivalents to the above compounds may be mentioned. Further, a mixture of such compounds may also be employed.

In the present invention, the component (B) is at least one member selected from the group consisting of (1) an ion-exchanging layered compound (other than a silicate) and (2) an inorganic silicate, which is obtained by salt-treatment and/or acid-treatment and which has a water content of not higher than 3% by weight. The component (B) before subjecting to salt-treatment and acid-treatment, is a compound having a crystal structure in which faces constituted by e.g. ionic bonds are piled in parallel to one another by a weak bonding force, and the majority of clays are ion-exchanging layered compounds. Clays are generally composed of clay minerals as the main component. These clays, clay minerals and ion-exchanging layered compounds may not only be natural products but also be artificially synthesized products. Examples of clays and clay minerals include an allophane group including allophane and the like, a kaolin group including dickite, nacrite, kaolinite, anauxite, and the like, a halloysite group including metahalloysite, halloysite, and the like, a serpentine group including chrysotile, antigorite, and the like, a smectite group including montmorillonite, beidellite, nontronite, saponite, hectorite, and the like, a vermiculite mineral including vermiculite, and the like, a mica mineral including illite, sericite, glauconite, and the like, attapulgite, sepiolite, palygorskite, bentonite, Kibushi clay, gairome clay, hisingerite, pyrophyllite, chlorite, and other groups. The ion-exchanging layered compound used in the present invention may be a mixture of these minerals. Among the above examples of the component (B), preferred are a kaolin group including dickite, nacrite, kaolinite and anauxite, a halloysite group including metahalloysite and halloysite, a serpentine group including chrysotile and antigorite, a smectite group including montmorillonite, beidellite, nontronite, saponite and hectorite, a vermiculite mineral including vermiculite, and a mica mineral including illite, sericite and glauconite. Particularly preferable examples include a smectite group including montmorillonite, beidellite, nontronite, saponite and hectorite. Also, preferable examples of artificially synthesized products include synthetic hectorite, synthetic mica, synthetic saponite, and the like.

Further, examples of ion-exchanging layered compounds include ion-crystalline compounds having a layered crystal structure of e.g. hexagonal most densely packed type, antimony type, $CdCl_2$ type or $CdI_2$ type. Specific examples of ion-exchanging layered compounds include crystalline acidic salts of polyvalent metals such as $\alpha\text{-}Zr(HAsO_4)_2 \cdot H_2O$, $\alpha\text{-}Zr(HPO_4)_2$, $\alpha\text{-}Zr(KPO_4)_2 \cdot 19H_2O$, $\alpha\text{-}Ti(HPO_4)_2$, $\alpha\text{-}Ti(HAsO_4)_2 \cdot H_2O$, $\alpha\text{-}Sn(HPO_4)_2 \cdot H_2O$, $\gamma\text{-}Zr(HPO_4)_2$, $\gamma\text{-}Ti(HPO_4)_2$, $\gamma\text{-}Ti(NH_4PO_4)_2 \cdot H_2O$, and the like.

Examples of an inorganic silicate before subjecting to salt-treatment and acid-treatment include zeolite and diatomaceous earth, and they may be synthesized products or naturally occurring minerals. Further, they may be used as they are without subjecting to any treatment, or they may be used after subjecting to ball milling, sieving, acid-treatment or the like. They may be used alone or in a mixture of two or more.

The component (B) before subjecting to salt-treatment and acid-treatment, i.e. at least one member selected from the group consisting of (1) an ion-exchanging layered compound other than a silicate and (2) an inorganic silicate before subjecting to salt-treatment and acid-treatment, contains an ion-exchangeable metal cation of Group 1 of the long-form Periodic Table (e.g. Na, K or the like) in an amount of at least 0.1% by weight, preferably at least 0.5% by weight.

The component (B) is obtained by subjecting at least one member selected from the group consisting of (1) an ion-exchanging layered compound other than a silicate and (2) an inorganic silicate to salt-treatment and/or acid-treatment. An acid strength of a solid can be varied by salt-treatment and/or acid-treatment. By the salt-treatment, an ion complex, a molecular complex or an organic derivative may be formed, and the surface area and the interlaminar distance may be changed. Further, utilizing ion exchangeability, interlaminar exchangeable ions may be substituted by other large bulky ions to obtain a layered substance having the interlaminar distance enlarged. In the present invention, at least one member selected from the group consisting of (1) an ion-exchanging layered compound other than a silicate and (2) an inorganic silicate before subjecting to salt-treatment preferably has at least 40% by weight, more preferably at least 60% by weight, of the ion-exchangeable Group 1 metal cation ion-exchanged with a cation dissociated from the following salts.

Examples of the salts used in the salt-treatment in the present invention to conduct the above ion-exchanging, include a compound containing a cation of at least one atom selected from the group consisting of Groups 2 to 14 atoms of the Periodic Table, preferably a compound comprising a cation of at least one atom selected from the group consisting of Groups 2 to 14 atoms and an anion of at least one member selected from a halogen atom, an inorganic acid and an organic acid, more preferably a compound comprising a cation of at least one atom selected from the group consisting of Groups 2 to 14 atoms and an anion of at least one member selected from the group consisting og $Cl^-$, $Br^-$, $I^-$, $F^-$, $PO_4^{3-}$, $SO_4^{2-}$, $NO_3^-$, $CO_3^{2-}$, $C_2O_4^{2-}$, $ClO_4^-$, $OOCCH_3^-$, $CH_3COCHCOCH_3^-$, $OCl_2^-$, $O(NO_3)_2^-$, $O(ClO_4)_3^{2-}$, $O(SO_4)^{2-}$, $OH^-$, $O_2Cl_2^{3-}$, $OCl_3^-$, $OOCH^-$, $OOCCH_{2CH3}^-$, $C_2H_4O_4^{2-}$, and $C_6H_5O_7^{3-}$.

More specific examples of the salts include
$CaCl_2$, $CaSO_4$, $CaC_2O_4$, $Ca(NO_3)_2$, $Ca_3(C_6H_5O_7)_2$, $MgCl_2$, $MgBr_2$, $MgSO_4$, $Mg_3(PO_4)_2$, $Mg(ClO_4)_2$, $MgC_2O_4$, $Mg(NO_3)_2$, $Mg(OOCCH_3)_2$, $MgC_2H_4O_4$, $Sc(OOCCH_3)_2$, $Sc_2(CO_3)_3$, $Sc_2(C_2O_4)_3$, $Sc(NO_3)_3$, $Sc_2(SO_4)_3$, $ScF_3$, $ScCl_3$, $ScBr_3$, $ScI_3$, $Y(OOCCH_3)_3$, $Y(CH_3COCHCOCH_3)_3$, $Y_2(CO_3)_3$, $Y_2(C_2O_4)_3$, $Y(NO_3)_3$, $Y(ClO_4)_3$, $YPO_4$, $Y_2(SO_4)_3$, $YF_3$, $YCl_3$, $La(OOCCH_3)_3$, $La(CH_3COCHCOCH_3)_3$, $La_2(CO_3)_3$, $La(NO_3)_3$, $La(ClO_4)_3$, $La_2(C_2O_4)_3$, $LaPO_4$, $La_2(SO_4)_3$, $LaF_3$, $LaCl_3$, $LaBr_3$, $LaI_3$, $Sm(OOCCH_3)_3$, $Sm(CH_3COCHCOCH_3)_3$, $Sm_2(CO_3)_3$, $Sm(NO_3)_3$, $Sm(ClO_4)_3$, $Sm_2(C_2O_4)_3$, $Sm_2(SO_4)_3$, $SmF_3$, $SmCl_3$, $SmI_3$, $Yb(OOCCH_3)_3$, $Yb(NO_3)_3$, $Yb(ClO_4)_3$, $Yb(C_2O_4)_3$, $Yb_2(SO_4)_3$, $YbF_3$, $YbCl_3$, $Ti(OOCCH_3)_4$, $Ti(CO_3)_2$, $Ti(NO_3)_4$, $Ti(So_4)_2$, $TiF_4$, $TiCl_4$, $TiBr_4$, $TiI_4$, $Zr(OOCCH_3)_4$, $Zr(CH_3COCHCOCH_3)_4$, $Zr(CO_3)_2$, $Zr(NO_3)_4$, $Zr(SO_4)_2$, $ZrF_4$, $ZrCl_4$, $ZrBr_4$, $ZrI_4$, $ZrOCl_2$, $ZrO(NO_3)_2$, $ZrO(ClO_4)_2$, $ZrO(SO_4)$, $Hf(OOCCH_3)_4$, $Hf(CO_3)_2$, $Hf(NO_3)_4$, $Hf(SO_4)_2$, $HfOCl_2$, $HfF_4$, $HfCl_4$, $HfBr_4$, $HfI_4$, $V(CH_3COCHCOCH_3)_3$, $VOSO_4$, $VOCl_3$, $VCl_3$, $VCl_4$, $VBr_3$, $Nb(CH_3COCHCO CH_3)_5$, $Nb_2(CO_3)_5$, $Nb(NO_3)_5$, $Nb_2(SO_4)_5$, $NbF_5$, $NbCl_5$, $NbBr_5$, $NbI_5$, $Ta(OOCCH_3)_5$, $Ta_2(CO_3)_5$, $Ta(NO_3)_5$, $Ta_2(SO_4)_5$, $TaF_5$, $TaCl_5$, $TaBr_5$, $TaI_5$, $Cr(CH_3COCHCOCH_3)_3$, $Cr(OOCH)_2OH$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $MoOCl_4$, $MoCl_3$, $MoCl_4$, $MoCl_5$, $MoF_6$, $MoI_2$, $WCl_4$, $WCl_6$, $WF_6$, $WBr_5$, $Mn(OOCCH_3)_2$, $Mn(CH_3COCHCOCH_3)_2$, $MnCO_3$, $Mn(NO_3)_2$, $Mn(ClO_4)_2$, $MnF_2$, $MnCl_2$, $MnBr_2$, $MnI_2$, $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeF_3$, $FeCl_2$, $FeBr_3$, $FeI_2$, $FeC_6H_5O_7$, $Co(OOCCH_3)_2$, $Co(CH_3COCHCOCH_3)_3$, $CoCO_3$, $Co(NO_3)_2$, $CoC_2O_4$, $Co(ClO_4)_2$, $Co_3(PO_4)_2$, CoSO$_4$, CoF$_2$, CoCl$_2$, CoBr$_2$, CoI$_2$, NiCO$_3$, Ni(NO$_3$)$_2$, NiC$_2$O$_4$, Ni(ClO$_4$)$_2$, NiSO$_4$, NiCl$_2$, NiBr$_2$, Pd(OOCCH$_3$)$_2$, Pd(NO$_3$)$_2$, PdSO$_4$, PdCl$_2$, PdBr$_2$, CuCl$_2$, CuBr$_2$, Cu(NO$_3$)$_2$, CuC$_2$O$_4$, Cu(ClO$_4$)$_2$, CuSO$_4$, Cu(OOCCH$_3$)$_2$, Zn(OOCCH$_3$)$_2$, Zn(CH$_3$COCHCOCH$_3$)$_2$, Zn(OOCH)$_2$, ZnCO$_3$, Zn(NO$_3$)$_2$, Zn(ClO$_4$)$_2$, Zn$_3$(PO$_4$)$_2$, ZnSO$_4$, ZnF$_2$, ZnCl$_2$, ZnBr$_2$, ZnI$_2$, Cd(OOCCH$_3$)$_2$, Cd(CH$_3$COCHCOCH$_3$)$_2$, Cd(OOCCH$_2$CH$_3$)$_2$, Cd(NO$_3$)$_2$, Cd(ClO$_4$)$_2$, CdSO$_4$, CdF$_2$, CdCl$_2$, CdBr$_2$, CdI$_2$, AlCl$_3$, AlI$_3$, AlBr$_3$, AlF$_3$, Al$_2$(SO$_4$)$_3$, AlPO$_4$, Al$_2$(C$_2$O$_4$)$_3$, Al(NO$_3$)$_3$, Al(CH$_3$COCHCOCH$_3$)$_3$, GeCl$_4$, GeBr$_4$, GeI$_4$, Sn(OOCCH$_3$)$_4$, Sn(SO$_4$)$_2$, SnF$_4$, SnCl$_4$, SnBr$_4$, SnI$_4$, Pb(OOCCH$_3$)$_4$, PbCO$_3$, PbHPO$_4$, Pb(NO$_3$)$_2$, Pb(ClO$_4$)$_2$, PbSO$_4$, PbF$_2$, PbCl$_2$, PbBr$_2$, PbI$_2$ and the like.

Among these salts, the component (B) treated with a compound containing a cation of Group 4, 5 or 6 provides an olefin polymer excellent in melt tension.

The acid treatment is intended not only to remove impurities on the surface but also to elute a part or the whole of cations such as Al, Fe or Mg in the crystal structure. Preferable examples of the acid used in the acid-treatment include hydrochloric acid, sulfuric acid, nitric acid, acetic acid and oxalic acid. The salt and the acid used in the treatment may be alone or a mixture of two or more. When the salt-treatment and the acid-treatment are conducted in combination, the salt-treatment may be conducted before or after the acid-treatment, or at the same time as the acid-treatment.

The treating conditions with the salts and the acids are not specially limited, but they are appropriately selected among the conditions of a salt or acid concentration of from 0.1 to 30% by weight, a treating temperature of from room temperature to a boiling point and a treating time of from 5 minutes to 24 hours, so as to elute at least a part of the material constituting a compound of at least one member selected from the group consisting of (1) an ion-exchanging layered compound other than a silicate and (2) an inorganic silicate. The salts and the acids are used generally in aqueous solutions.

In the present invention, particle shapes may be controlled by subjecting to ball milling, sieving or the like before treatment, during treatment or after treatment of the above salt-treatment and/or acid-treatment. Further, chemical treatment including alkali-treatment, organic substance-treatment or the like may be conducted in combination. The component (B) thus obtained preferably has a pore volume of pores (having a radius of at least 20 Å) of at least 0.1 cc/g, more preferably of from 0.3 to 5 cc/g, as measured by a mercury injection method.

These compounds of at least one member selected from the group consisting of an ion-exchanging layered compound (other than a silicate) and an inorganic silicate generally contain adsorbed water and interlaminar water. In the present invention, these adsorbed water and interlaminar water are removed to obtain the component (B).

The "adsorbed water" is water adsorbed on the surface or crystal broken face of clay, clay mineral or ion-exchanging layered compound particles, and the "interlaminar water" is water present between layers of crystal. A method of heat-treatment for removing the adsorbed water and interlaminar water from clay, clay mineral or ion-exchanging layered compound particles is not specially limited, but various methods such as heat-dehydration, heat-dehydration under gas-flowing, heat-dehydration under reduced pressure and azeotropic dehydration with an organic solvent. The heating temperature employed is such a temperature of at least 100° C., preferably at least 150° C., as to substantially remove interlaminar water, but it is not preferable to employ such a high temperature as to destroy a structure. Also, such a heat-dehydration method as to heat in an air stream is not preferable since it forms a crosslinking structure and lowers polymerization activity of a catalyst. The heating time is at least 0.5 hour, preferably at least 1 hour. After removing the adsorbed water and the interlaminar water, the water content of the component (B) should be not higher than 3% by weight, preferably not higher than 1% by weight, on the basis of the assumption that the water content of the component (B) remained after dehydrating at 200° C under a pressure of 1 mmHg for 2 hours is 0% by weight. In the present invention, it is necessary to handle the dehydrated component (B) having a water content of not higher than 3% by weight so as to maintain the water content at the same level when it is contacted with the component (A) and optionally with the component (C).

Examples of an organic aluminum compound optionally used as the component (C) in the present invention include a compound of the formula,

$$AlR^6_j X_{3-j}$$

(wherein $R^6$ is a $C_{1-20}$ hydrocarbon group, X is hydrogen, halogen or an alkoxy ($C_{1-10}$) group, and j is a number of $0<j\leq 3$), e.g. a trialkylaluminum such as trimethylaluminum, triethylaluminum, tripropylaluminum and triisobutylaluminum, and a halogen- or alkoxy-containing alkylaluminum such as diethylaluminum monochloride and diethylaluminum methoxide. In addition to these compounds, an aluminoxane such as methylaluminoxane can also be used. Among these compounds, a trialkylaluminum is particularly preferable.

A catalyst is prepared by contacting the component (A) and the component (B), and optionally the component (C). The contacting order of the respective components of the catalyst is not particularly limited. The contacting may be conducted at the time of preparing a catalyst and/or at the time of prepolymerization or polymerization of olefin. They may, for example, be contacted in the following orders:

① Components (A) and (B) are contacted.
② Components (A) and (B) are contacted, and then component (C) is added.
③ Components (A) and (C) are contacted, and then component (B) is added.
④ components (B) and (C) are contacted, and then component (A) is added.

Other than the above orders, the three components may simultaneously be contacted.

During or after contacting the respective catalyst components, a polymer such as polyethylene or polypropylene, or a solid of an inorganic oxide such as silica or alumina, may be present or contacted.

The contacting may be conducted in an inert gas such as nitrogen or in an inert hydrocarbon solvent such as pentane, hexane, heptane, toluene and xylene. The contacting temperature is from –20° C. to a boiling point of a solvent, preferably from room temperature to a boiling point of a solvent.

With regard to the amounts of the respective catalyst components, the amount of the component (A) is from 0.0001 to 10 mmol, preferably from 0.001 to 5 mmol, per g of the component (B) and the amount of the component (C) is from 0.01 to 10000 mmol, preferably from 0.1 to 100 mmol, per g of the component (B). Also, the atomic ratio of a transition metal in the component (A)/aluminum in the component (C) is 1/0.01 to 1000000, preferably 1/0.1 to 100000.

The catalyst thus obtained may be used with or without washing after contacting.

Also, if necessary, the component (C) may be newly added. The amount of the component (C) in such a case is selected so as to make the atomic ratio of a transition metal in the component (A)/aluminum in the component (C) be 1/6 to 10000.

Before polymerization, the catalyst thus obtained may be used to preliminarily polymerize an olefin such as ethylene, propylene, 1-butene, 1-hexene, 1-octene, 4-methyl-1-pentene, 3-methyl-1-butene, vinylcycloalkane or styrene, and the catalyst thus adjusted in the preliminary polymerization may be used with or without washing.

It is preferable to conduct this preliminary polymerization in an inert solvent under a mild condition so as to produce from 0.01 to 1000 g, preferably from 0.1 to 100 g of a polymer per g of a solid catalyst.

The olefin to be used for polymerization may be ethylene, propylene, 1-butene, 1-hexene, 3-methyl-1-butene, 3-methyl-1-pentene, 4-methyl-1-pentene, vinylcycloalkane, styrene or derivatives thereof. This polymerization may suitably be applied not only to homopolymerization but also to usual random copolymerization or block copolymerization.

The polymerization reaction is conducted in the presence or absence of a solvent such as a liquefied α-olefin or an inert hydrocarbon such as butane, pentane, hexane, heptane, toluene or cyclohexane. The temperature is usually within a range of from $-50°$ C. to $+250°$ C. The pressure is not particularly limited, but is preferably within a range of from atmospheric pressure to about 2,000 $kgf/cm^2$.

Further, hydrogen as a molecular weight controlling agent may be present in the polymerization system.

EXAMPLES

Now, the present invention will be described in further detail with reference to Examples. However, it should be understood that the present invention is by no means restricted by such specific Examples.

All of the following catalyst preparation steps and polymerization steps were conducted under an atmosphere of purified nitrogen. Also, a solvent used was dehydrated with molecular sieve MS-4A and was degased by bubbling with purified nitrogen. In the Examples, melt index (MI) was measured at 190° C. under a load of 2.16 kg in accordance with ASTM D1238.

Density was measured by heating a strand obtained at the time of measuring melt index at 100° C. for one hour, allowing the heat-treated strand to stand at room temperature for one hour and then measuring in accordance with density-gradient tube method.

Melt tension (MT) of a polymer was measured by using a melt tension tester (manufactured by Intesco Co., Ltd.) under conditions of a nozzle diameter of 2.095 mmø, a nozzle length of 8 mm, an introducing angle of 90°, a temperature of 190° C., an extruding speed of 0.716 cc/min, a withdrawing speed of 10 m/min and an air gap of 40 cm. In the measurement of the above-mentioned MI and MT, 0.1% by weight of 2,6-di-t-butylparacresol was previously incorporated into an ethylene type polymer.

Analysis of the composition of the component (B) was conducted by preparing a glass bead and subjecting it to X-ray fluorescence measurement. The glass bead was prepared in the following manner. 0.5 g of a carrier previously calcined at 920° C. for 3 minutes was taken by weighing, and 4.5 g of $LiBr/Li_2B_4O_7$ was blended therewith. The resultant blend was placed in a platinum crucible for preparing a glass bead, and was set in a bead sampler. In the bead sampler, it was calcined at 920° C. (0.2 A) for 60 seconds, and was melted at 1200° C. (0.28 A) for 200 seconds and was fluctuated at 1200° C. (0.28 A) for 200 seconds. The melting and the fluctuating were repeated twice. After cooling by allowing it to stand, the glass bead was taken out from the platinum crucible.

The glass bead was measured by a X-ray fluorescence measuring device, and was quantitatively analyzed on the basis of a calibration curve previously prepared.

Example 1

(1) Chemical treatment of clay mineral 15.3 g of a commercially available montmorillonite ("Kunipia F" prepared by Kunimine Kogyo K.K.) was dispersed in 300 ml of a deionized water having 14.5 g of $Al_2(SO_4)_3.14–18H_2O$ dissolved, and was dispersed at room temperature for 30 minutes and was then filtered. After repeating this operation once, the filter cake was fully washed with a deionized water, and was dried to obtain a chemically treated montmorillonite.

(2) Heat-dehydration treatment of clay mineral 1.29 g of the chemically treated montmorillonite obtained in the above step (1) was placed in a 100 ml flask, and was heat-treated under a reduced pressure at an elevated temperature for 200° C. for 2 hours. By this heat-treatment, the weight of the product was reduced by 0.17 g.

(3) Preparation of catalyst

To the above heat-dehydrated montmorillonite, was added 10 ml of toluene to prepare a slurry. 2.3 ml of triethylaluminum/toluene solution (1 mmol/ml) was added to the slurry while stirring at room temperature. After contacting these components at room temperature for one hour, a solid component was washed with toluene. Thereafter, 20 ml of toluene was added to the solid component, and 3.1 ml of bis(cyclopentadienyl)zirconium dichloride/toluene solution (29 μmol/ml) was then added thereto. These components were contacted at room temperature for one hour to obtain a catalyst component.

(4) Copolymerization of ethylene-butene 840 ml of n-hexane, 0.1 mmol of triethylaluminum and 160 ml of 1-butene were placed in a 2 l autoclave, and were heated to 70° C. Thereafter, 28.3 mg of the catalyst component obtained in the above step (3) was introduced therein together with ethylene, and polymerization was conducted at 70° C. for one hour by maintaining the total pressure at 25 $kg/cm^2$. After one hour, ethanol was added thereto to terminate the polymerization. The amount of the ethylene-butene copolymer thus obtained was 230 g which corresponds to 8,130 g produced per g of the solid catalyst component.

Example 2

(1) Chemical treatment

A chemical treatment was conducted in the same manner as in Example 1(1), except that 200 ml of a deionized water having 2.9 g of $ZnCl_2$ dissolved was used in place of the $Al_2(SO_4)_3$ aqueous solution of Example 1(1).

(2) Heat-dehydration treatment 1.21 g of the chemically treated montmorillonite obtained in the above chemical treatment (1) was subjected to heat-treatment in the same manner as in Example 1(2). As this result, the weight of the montmorillonite was reduced by 0.13 g.

(3) Preparation of catalyst

A catalyst component was prepared in the same manner as in Example 1(3), except that the heat-dehydrated montmorillonite obtained in the above step (2) was used.

(4) Copolymerization of ethylene-butene

Copolymerization of ethylene-butene was conducted in the same manner as in Example 1(4), except that 20.4 mg of the catalyst component obtained in the above catalyst preparation step (3) was used as a solid component. The copolymer thus obtained was 173 g, and the amount of the copolymer produced per g of the solid component was 8,480 g.

Example 3

(1) Chemical treatment

A chemical treatment was conducted in the same manner as in Example 1(1), except that 100 ml of a deionized water having 4.0 g of $MgCl_2.6H_2O$ dissolved was used in place of the $Al_2(SO_4)_3$ aqueous solution of Example 1(1).

(2) Heat-dehydration treatment 1.28 g of the chemically treated montmorillonite obtained in the above chemical treatment (1) was subjected to heat-treatment in the same manner as in Example 1(2). As this result, the weight of the heat-treated montmorillonite was reduced by 0.18 g.

(3) Preparation of catalyst

A catalyst component was prepared in the same manner as in Example 1(4), except that the heat-dehydrated montmorillonite obtained in the above heat-dehydration step (2) was used.

(4) Copolymerization of ethylene-butene

Copolymerization of ethylene-butene was conducted in the same manner as in Example 1(4), except that 21.8 mg of the catalyst component obtained in the above catalyst preparation step (3) was used as a solid component. The amount of the copolymer thus obtained was 62 g, and the amount of the copolymer thus produced per g of the solid component is 2,840 g.

Example 4

(1) Chemical treatment 15.5 g of a commercially available synthetic mica ("ME-100" prepared by Corp Chemical Co., Ltd.) was dispersed in 200 ml of a 1.1% sulfuric acid aqueous solution, and was stirred at room temperature for 5 minutes and was then filtered to obtain a solid part. This operation was repeated further twice, and the solid part thus obtained was fully washed with a deionized water and dried to obtain a chemically treated synthetic mica.

(2) Heat-dehydration treatment 1.31 g of the chemically treated synthetic mica obtained in the above chemical treatment step (1) was placed in a 100 ml flask, and was heated to an elevated temperature of 200° C. under a reduced pressure and was heat-dehydrated-at 200° C. for 2 hours under a reduced pressure. By this heat-dehydration treatment, the weight of the chemically treated synthetic mica was reduced by 0.19 g.

(3) Preparation of catalyst

A catalyst component was prepared in the same manner as in Example 1(3), except that the heat-dehydrated synthetic mica obtained in the above step (2) was used.

(4) Copolymerization of ethylene-butene

Copolymerization of ethylene-butene was conducted in the same manner as in Example 1(4), except that the copolymerization was conducted at 70° C. for 40 minutes by using 31.1 mg of the catalyst component obtained in the above catalyst preparation step (3) as a solid component.

The amount of the copolymer thus obtained was 197 g, and the amount of the copolymer produced per g of the solid component was 6,340 g.

Example 5

(1) Chemical treatment 188 ml of a 3% sulfuric acid aqueous solution was added to 19.3 g of a commercially available montmorillonite, and the resultant mixture was heated under stirring and was treated at 90° C. for 2 hours and filtrated. Thereafter, the filtrated product was fully washed with a deionized water and dried to obtain a chemically treated montmorillonite.

(2) Heat-dehydration treatment 1.51 g of the chemically treated montmorillonite obtained in the above chemical treatment step (1) was placed in a 100 ml flask, and was heated to an elevated temperature of 200° C. under a reduced pressure and was heat-dehydrated at 200° C. for 2 hours under a reduced pressure. By this heat-dehydration treatment, the weight of the montmorillonite was reduced by 0.27 g.

(3) Preparation of catalyst 6.5 ml of toluene was added to the heat-dehydrated montmorillonite obtained in the above step (2) to form a slurry. 2.8 ml of triethylaluminum/toluene solution (0.88 mmol/ml) was added to the above formed slurry under stirring at room temperature. After contacting the components at room temperature for one hour, a solid component was washed with toluene. Thereafter, after adding 30 ml of toluene, 2.7 ml of bis(cyclopentadienyl)zirconium dichloride/toluene solution (36.7 µmol/ml) was added thereto. These components were contacted at room temperature for one hour to obtain a catalyst component.

(4) Copolymerization of ethylene-butene

Copolymerization of ethylene-butene was conducted in the same manner as in Example 1(4), except that 41.4 mg of the catalyst component obtained in the above catalyst preparation step (3) was used as a solid component. The amount of the copolymer thus obtained was 305 g, and the amount of the copolymer produced per g of the solid component was 7,360 g.

Example 6

1.22 g of the chemically treated montmorillonite obtained in Example 5(1) was heat-dehydrated in the same manner as in Example 5(2). By this treatment, the weight of the montmorillonite was reduced by 0.22 g. 20 ml of toluene was added to 0.22 g of the montmorillonite thus treated to form a slurry. To the slurry thus formed, was added 3.0 ml of bis(cyclopentadienyl)zirconium dichloride/toluene solution (29 µmol/ml) under stirring at room temperature, and these components were contacted at room temperature for one hour to obtain a catalyst component.

Copolymerization of ethylene-butene was conducted in the same manner as in Example 1(4), except that 5.4 mg of the above obtained catalyst component was used as a solid component. The amount of the copolymer thus obtained was 33 g, and the amount of the copolymer produced per g of the solid component was 6,110 g.

Example 7

(1) Chemical treatment of clay mineral 11.1 g of a commercially available synthetic hectorite ("hydrophilic smectite SWN" prepared by Corp Chemical Co., Ltd.) was dispersed in 90 me of a 3.0% sulfuric acid aqueous solution, and the dispersion was stirred at room temperature for 2 hours. After filtrating, the resultant product was fully washed with a deionized water and dried to obtain a chemically treated synthetic hectorite.

(2) Heat-dehydration treatment 1.37 g of the chemically treated synthetic hectorite obtained in the above chemical treatment step (1) was subjected to heat treatment in the same manner as in Example 5(2). As this result, the weight of the hectorite thus treated was reduced by 0.19 g.

(3) Preparation of catalyst

A catalyst component was prepared in the same manner as in Example 5(3), except that the heat-dehydrated synthetic hectorite obtained in the above step (2) was used.

(4) Copolymerization of ethylene-butene

Copolymerization of ethylene-butene was conducted in the same manner as in Example 1(4), except that 45.7 mg of the catalyst component obtained in the above step (3) was used as a solid component. The amount of the copolymer thus obtained was 258 g, and the amount of the copolymer produced per g of the solid component was 5,650 g.

Examples 8 to 10

15 g of each of commercially available synthetic hectorites was subjected to various chemical treatments under the conditions as shown in the following Table 1 in the same manner as in Example 1(1). These hectorites thus treated were heat-dehydrated in the same manner as in Example 1(2) and catalyst components were obtained in the same manner as in Example 1(3).

Copolymerization of ethylene-butene was conducted in the same manner as in Example 1(4) by using these catalyst components. The results are shown in the following Table 1.

part. This operation was repeated further 3 times, and the product thus obtained was fully washed with a deionized water and dried to obtain a chemically treated synthetic hectorite. The composition of the above chemically treated synthetic hectorite was analyzed and it was proved that it contained 0.02% by weight of Na and 16.6% by weight of Mg.

(2) Heat-dehydration treatment 1.44 g of the above chemically treated synthetic hectorite obtained in the above step (1) was heat-dehydrated in the same manner as in Example 1(2). By this treatment, the weight of the product thus treated was reduced by 0.15 g.

(3) Preparation of catalyst 6.5 ml of toluene was added to the above heat-dehydrated synthetic hectorite to form a slurry. To the slurry thus formed, was added 2.2 ml of triethylaluminum/toluene solution (1.2 mmol/ml) under stirring at room temperature. These components were contacted at room temperature for one hour, and a solid component was washed with toluene. Thereafter, 20 ml of toluene was added thereto, and 4.0 ml of bis(cyclopentadienyl)zirconium dichloride/toluene solution (29 $\mu$mol/ml) was then added. These components were contacted at room temperature for one hour to obtain a catalyst component.

(4) Copolymerization of ethylene-butene

Copolymerization of ethylene-butene was conducted in the same manner as in Example 1(4), except that 41.7 mg of the catalyst component obtained in the above step (3) was used as a solid component. The amount of the copolymer thus obtained was 294 g, and the amount of the copolymer produced per g of the solid component was 7,050 g.

TABLE 1

| | Chemical treatment | | | | Copolymerization of ethylene-butene | | |
| --- | --- | --- | --- | --- | --- | --- | --- |
| No. | Treating aqueous solution | Treating condition | Treating time | Solid component | Polymerization condition | Amount of copolymer | Amount of copolymer produced per g of solid component |
| Example 8 | AlCl$_3$.6H$_2$O 5.3 g/200 ml | Room temp.-5 min. | 3 times | 34.4 mg | 70° C.-1 hr. | 150 g | 8,720 g |
| Example 9 | MgSO$_4$ 3.6 g/300 ml | Room temp.-30 min. | 2 times | 29.6 mg | 70° C.-1 hr. | 204 g | 6,900 g |
| Example 10 | CaCl$_2$ 8.1 g/200 ml | Room temp.-1 hr. | 2 times | 34.7 mg | 70° C.-1 hr. | 20 g | 580 g |

Example 11

(1) Chemical treatment

The composition of a commercially available synthetic hectorite (hydrophilic smectite SWN) was determined by X-ray fluorescence measurement. As this result, it was proved that it contained 3.26% by weight of Na and 15.0% by weight of Mg.

15 g of the above synthetic hectorite was dispersed in 200 ml of a desalinated water having 6.7 g of MgCl$_2$.6H$_2$O dissolved. The dispersion thus obtained was stirred at room temperature for 15 minutes and was filtrated to obtain a solid Examples 12 to 21

15 g of each of commercially available synthetic micas was subjected to various chemical treatments under the conditions shown in the following Table 2 in the same manner as in Example 1(1). The micas thus chemically treated were heat-dehydrated in the same manner as in Example 1(2), and catalyst components were obtained in the same manner as in Example 1(3).

Copolymerization of ethylene-butene was conducted in the same manner as in Example 1(4) by using these catalyst components. The results are shown in the following Table 2.

TABLE 2

| | Chemical treatment | | | | Copolymerization of ethylene-butene | | |
|---|---|---|---|---|---|---|---|
| No. | Treating aqueous solution | Treating condition | Treating time | Solid component | Polymerization condition | Amount of copolymer | Amount of copolymer produced per g of solid component |
| Example 12 | $MgCl_2.6H_2O$ 6.7 g/200 ml | Room temp. -15 min. | 4 times | 29.2 mg | 70° C.-1 hr. | 246 g | 8,440 g |
| Example 13 | $LaCl_3.7H_2O$ 6.2 g/200 ml | Room temp. -30 min. | 2 times | 25.3 mg | 70° C.-1 hr. | 28 g | 1,100 g |
| Example 14 | $Fe(NO_3)_3.9H_2O$ 7.8 g/200 ml | Room temp. -30 min. | 2 times | 29.6 mg | 70° C.-30 min. | 183 g | 6,170 g |
| Example 15 | $Ni(NO_3)_2.6H_2O$ 4.8 g/200 ml | Room temp. -30 min. | 2 times | 28.0 mg | 70° C.-1 hr. | 218 g | 7,800 g |
| Example 16 | $CuSO_4.5H_2O$ 4.4 g/200 ml | Room temp. -30 min. | 2 times | 31.3 mg | 70° C.-1 hr. | 37 g | 1,200 g |
| Example 17 | $ZnCl_2$ 2.3 g/200 ml | Room temp. -30 min. | 2 times | 25.3 mg | 70° C.-15 min. | 163 g | 6,440 g |
| Example 18 | $SnCl_4.5H_2O$ 5.2 g/200 ml | Room temp. -30 min. | 2 times | 30.0 mg | 70° C.-22 min. | 314 g | 10,470 g |
| Example 19 | $Zr(SO_4)_2.4H_2O$ 6.4 g/200 ml | Room temp. -30 min. | 2 times | 29.4 mg | 70° C.-25 min. | 152 g | 5,170 g |
| Example 20 | $MnCl_2.4H_2O$ 3.3 g/200 ml | Room temp. -30 min. | 2 times | 22.2 mg | 70° C.-1 hr. | 115 g | 5,180 g |
| Example 21 | $Mg(OOCCH_3)_2.4H_2O$ 3.8 g/200 ml | Room temp. -30 min. | 2 times | 24.5 mg | 70° C.-45 min. | 154 g | 6,290 g |

Example 22

(1) Chemical treatment

The commercially available synthetic mica was determined by X-ray fluorescence measurement. As this result, it was proved that it contained 3.58% by weight of Na and 0% by weight of Al.

15 g of the above synthetic mica was dispersed in 300 ml of a deionized water having 14.1 g of $Al_2(SO_4)_3.14–18H_2O$ dissolved. The dispersion thus obtained was stirred at room temperature for 30 minutes and was filtrated to obtain a solid part. This operation was repeated further once, and the resultant product was fully washed with a deionized water and dried to obtain a chemically treated synthetic mica. The composition of the mica thus treated was determined, and it was proved that it contained 1.02% by weight of Na and 0.93% by weight of Al.

(2) Heat-dehydration treatment 1.30 g of the chemically treated synthetic mica obtained in the above step (1) was heat-dehydrated in the same manner as in Example 1(2). By this treatment, the weight of the mica was reduced by 0.08 g.

(3) Preparation of catalyst

A catalyst component was prepared in the same manner as in Example 11(3) by using the above heat-dehydrated synthetic mica.

(4) Copolymerization of ethylene-butene

Copolymerization of ethylene-butene was conducted in the same manner as in Example 1(4), except that 30.0 mg of the catalyst component obtained in the above step (3) was used as a solid component and copolymerization was conducted at 70° C. for 25 minutes. The amount of the copolymer thus obtained was 209 g, and the amount of the copolymer produced per g of the solid component was 6,970 g.

Example 23

(1) Chemical treatment and granulation of clay mineral 8 kg of a commercially available montmorillonite ("Kunipia F" prepared by Kunimine Kogyo K. K.) was pulverized by a vibrating ball mill, and the pulverized montmorillonite was dispersed in 50 l of a deionized water having 10 kg of magnesium chloride dissolved. The dispersion thus obtained was stirred at 80° C. for one hour, and the solid component thus obtained was washed with water. The washed solid component was then dispersed in 56 l of a 8.2% hydrochloric aqueous solution, and was stirred at 90° C. for 2 hours and was washed with a deionized water. 4.6 kg of the above chemically treated montmorillonite was prepared into an aqueous slurry having a solid content concentration of 15.2%, and the slurry was spray-granulated by a spray dryer. The granule thus obtained had a spherical shape.

(2) Heat-dehydration treatment of clay mineral 12.6 g of the montmorillonite granulated in the above step (1) was placed in a 200 ml four-necked flask, and was heated to 200° C. under a reduced pressure and was heat-treated at 200° C. for 2 hours under a reduced pressure. The weight of the montmorillonite thus treated was reduced by 1.3 g. After the heat-treatment, 50 ml of toluene was added to form a toluene slurry.

(3) Preparation of catalyst 6 ml of the toluene slurry (clay mineral content; 1.31 g) obtained in the above step (2) was placed in a 100 ml four-necked flask, and was stirred at room temperature and 2.6 mmol of triethylaluminum was added thereto. After contacting these components at room temperature for 0.5 hour, 6 ml of bis(cyclopentadienyl)zirconium dichloride/toluene solution (34.6 $\mu$mol/ml) was added thereto. After contacting these components at room temperature for 0.5 hour, the supernatant liquid was withdrawn and the remaining solid component was washed with toluene.

(4) Copolymerization of ethylene-butene 740 ml of n-hexane, 0.1 mmol of triethylaluminum and 160 ml of 1-butene were placed in a 2 l autoclave, and were heated to 70° C. Thereafter, 53 mg of the solid component obtained in the above step (3) was added thereto, together with ethylene, and polymerization was conducted at 70° C. for 1 hour by maintaining the total pressure at 25 kg/cm$^2$. After one hour, ethanol was added to terminate the polymerization. The amount of the ethylene-butene copolymer thus obtained was 243 g, and the amount of the polymer produced per g of the solid component was 4,580 g.

Examples 24 to 26

(1) Heat-dehydration treatment 1.35 g of the granulated montmorillonite obtained in Example 23(1) was heat-dehydrated in the same manner as in Example 23(2). By this treatment, the weight of the montmorillonite thus treated was reduced by 0.14 g. The water content of the heat-dehydrated montmorillonite was 0% by weight.

Water was added to heat-dehydrated montmorillonites separately obtained in the same manner as mentioned above to adjust their water contents as shown in the following Table 3.

(2) Preparation of catalyst

Catalyst components were prepared in the same manner as in Example 1(3) by using 1.2 g (dry weight) of each of montmorillonites having various water contents obtained in the above step (1).

(3) Copolymerization of ethylene-butene

Copolymerization of ethylene-butene was conducted in the same manner as in Example 23(4), except that 40.0 mg of each of the catalyst components obtained in the above step (2) was used as a solid component. The results are shown in the following Table 3.

TABLE 3

| No. | Water content | Copolymerization of ethylene-butene | |
|---|---|---|---|
| | | Amount of copolymer | Amount of copolymer produced per g of solid component |
| Example 24 | 0 wt % | 154 g | 3,840 g |
| Example 25 | 0.8 wt % | 145 g | 3,630 g |
| Example 26 | 3.0 wt % | 69 g | 1,730 g |

Example 27

(1) Preparation of catalyst 6 ml of the toluene slurry (clay mineral content: 1.31 g) obtained in Example 23(2) was placed in a 100 ml four-necked flask, and 6 ml of bis(cyclopentadienyl)zirconium dichloride/toluene solution (34.6 μmol/ml) was added thereto under stirring at room temperature. After contacting these components at room temperature for 0.5 hour, 2.6 mmol of triethylaluminum was added thereto. After contacting these components at room temperature for 0.5 hour, ethylene was continuously flown therethrough for one hour at room temperature. After stopping the flowing of ethylene, the supernatant liquid was withdrawn and the remaining solid component was washed with toluene. The solid component thus obtained, contained 0.5 g of an ethylene polymer per g of the clay mineral.

(2) Copolymerization of ethylene-butene

Copolymerization of ethylene-butene was conducted in the same manner as in Example 23(4), except that 47 mg (excluding the weight of the polymer) of the catalyst component obtained in the above step (1) was used as a solid component. The amount of the ethylene-butene copolymer thus obtained was 215 g, and the amount of the copolymer produced per g of the solid component was 4,570 g.

Example 28

(1) Preparation of catalyst 13 ml (clay mineral content: 2.84 g) of the toluene slurry obtained in Example 23(2) and 18 ml of toluene were placed in a 200 ml four-necked flask, and were heated under stirring and were refluxed. 31.7 mmol of triethylaluminum was added thereto under refluxing, and these components were contacted for 1 hour under refluxing. Thereafter, the supernatant liquid was withdrawn at room temperature and the remaining solid component was washed with toluene. 30 ml of toluene was added to the washed solid component, and 20 ml of bis(cyclopentadienyl)zirconium dichloride/toluene slurry (87.8 μmol/ml) was added thereto. After contacting these components at room temperature for one hour, the supernatant liquid was withdrawn and the remaining solid component was washed with toluene.

(2) Copolymerization of ethylene-butene

Copolymerization of ethylene-butene was conducted in the same manner as in Example 23(4), except that 49 mg of the solid component obtained in the above step (1) was used at 60° C. The amount of the ethylene-butene copolymer thus obtained was 152 g, and the amount of the copolymer produced per g of the solid component was 3,100 g.

Example 29

(1) Preparation of catalyst 5 ml of the toluene slurry (clay mineral content: 1.09 g) obtained in Example 23(2) was placed in a 100 ml four-necked flask, and 1.07 mmol of triisobutylaluminum was added thereto at room temperature under stirring. After contacting these components at room temperature for 0.5 hour, 2.5 ml of bis(cyclopentadienyl)zirconium dichloride/toluene solution (34.6 μmol/ml) was added thereto. After contacting these components at room temperature for one hour, the supernatant liquid was withdrawn and the remaining solid component was washed with toluene.

(2) Copolymerization of ethylene-butene

Copolymerization of ethylene-butene was conducted in the same manner as in Example 23(4), except that triisobutylaluminum was used in place of triethylaluminum and 41 mg of the catalyst component obtained in the above step (1) was used. The amount of the ethylene-butene copolymer thus obtained was 180 g, and the amount of the copolymer produced per g of the catalyst component was 4,390 g.

Example 30

(1) Preparation of catalyst 5 ml of the toluene slurry (clay mineral content: 1.09 g) obtained in Example 23(2) was placed in a 100 ml four-necked flask, and 1.12 mmol of triethylaluminum was added thereto under stirring at room temperature. After contacting these components at room temperature for 0.5 hour, 28 me of ethylene-bis(indenyl)zirconium dichloride/toluene solution (3.17 μmol/ml) was added thereto. After contacting these components at room temperature for 0.5 hour, the supernatant liquid was withdrawn and the remaining solid component was washed with toluene.

(2) Copolymerization of ethylene-butene 970 ml of n-hexane, 0.05 mmol of triethylaluminum and 30 ml of 1-butene were placed in a 2 l autoclave, and were heated to 60° c. Thereafter, 24 mg of the solid catalyst component obtained in the above step (1) was added thereto, together with ethylene, and polymerization was conducted at 60° C. for 1 hour by maintaining the total pressure at 25 kg/cm$^2$. After one hour, the polymerization was terminated by adding ethanol. The amount of the ethylene-butene copolymer thus obtained was 150 g, and the amount of the copolymer produced per g of the solid component was 6,250 g.

Example 31

(1) Chemical treatment of clay mineral 50 g of a commercially montmorillonite was pulverized for 4 hours by using a vibrating ball mill, and the pulverized montmorillonite was dispersed in 350 ml of a 3% hydrochloric aqueous solution and was stirred at 90° C. for 2 hours. Thereafter, it was washed with a deionized water and dried to obtain a hydrochloric acid-treated montmorillonite.

Thereafter, 20 g of the montmorillonite thus treated was placed in a 1 l flask, and was dispersed in 400 ml of deionized water having 2 g of Zr(SO$_4$)$_2$.4H$_2$O dissolved and was stirred at 90° C. for 3 hours. After this treatment, the solid component was washed with a deionized water and was dried to obtain a chemically treated montmorillonite.

(2) Heat-dehydration treatment of clay mineral 10.0 g of the chemically treated montmorillonite obtained in the above step (1) was placed in a 200 ml flask, and was heat-dehydrated at 200° C. for 2 hours under a reduced pressure. The weight of the montmorillonite thus treated was reduced by 1.2 g.

(3) Preparation of catalyst component 3.0 g of the chemically treated montmorillonite obtained in the above step (2) was placed in a 100 ml flask, and was dispersed in 15 ml of toluene to form a slurry. The slurry thus formed was stirred at room temperature, and 6.0 mmol of triethylaluminum was added thereto. After contacting these components at room temperature for 1 hour, the supernatant liquid was withdrawn and the remaining solid part was washed with toluene. After adding toluene to the washed solid part to form a slurry, 12.0 ml of bis(cyclopentadienyl) zirconium dichloride/toluene solution (20.0 μmol/ml) was added thereto and the resultant mixture was stirred at room temperature for one hour. The supernatant liquid was withdrawn and the remaining solid component was washed with toluene to obtain a catalyst component.

(4) Copolymerization of ethylene-butene 740 ml of n-hexane, 0.1 mmol of triethylaluminum and 50.0 mg of the catalyst component obtained in the above step (3) were placed in a 2 l autoclave. 160 ml of 1-butene was added to this autoclave, and was heated to 70° C. Thereafter, ethylene was introduced to maintain the total pressure at 25.5 kg·f/cm², and polymerization was conducted for 1 hour under continuously stirring. Polymerization was terminated by adding 10 ml of ethanol. The amount of the ethylene-butene copolymer thus obtained was 175 g. The copolymer thus obtained had a MI value of 0.74 g/10 minutes, a density of 0.918 g/cm³ and a MT value of 14.2 g.

Example 32

(1) Chemical treatment of clay mineral

A commercially available montmorillonite was chemically treated in the same manner as in Example 31(1), except that $Zr(SO_4)_2 \cdot 4H_2O$ was used in an amount of 20 g.

(2) Preparation of catalyst component

The chemically treated montmorillonite obtained in the above step (1) was heat-dehydrated in the same manner as in Example 31(2), and 3.0 g of the montmorillonite thus treated was placed in a 100 ml of flask, and was dispersed in 15 ml of toluene to form a slurry. Thereafter, 6.0 mmol of triethylaluminum was added to the slurry under stirring at room temperature. After contacting these components at room temperature for 2 hours, the supernatant liquid was withdrawn and the remaining solid part was washed with toluene and toluene was further added to the washed solid part to form a slurry.

On the other hand, 12.0 ml of bis(cyclopentadienyl) zirconium dichloride/toluene solution (20.0 μmol/ml) was placed in another 100 ml flask and 2.4 ml of triethylaluminum/toluene solution (1.0 mmol/ml) was added thereto, thereby reacting the components at room temperature for 30 minutes under stirring.

Thereafter, the whole amount of this reaction solution was added to the above prepared montmorillonite-toluene slurry, and these components were contacted at room temperature for 30 minutes under stirring. Thereafter, the supernatant liquid was withdrawn and the remaining solid part was washed with toluene to obtain a catalyst component.

(3) Copolymerization of ethylene-butene

Copolymerization of ethylene-butene was conducted in the same manner as in Example 31(4) by using 100.0 mg of the catalyst component obtained in the above step (2). As this result, the amount of the ethylene-butene copolymer thus obtained was 120 g, and this copolymer had a MI value of 0.25 g/10 minutes, a density of 0.917 g/cm³ and a MT value of 32.5 g Example 33

(1) Chemical treatment of clay mineral 50 g of a commercially available montmorillonite was pulverized by using a vibrating ball mill for 4 hours, and the pulverized montmorillonite was dispersed in 350 ml of a 9% sulfuric acid aqueous solution. The dispersion was then stirred at 90° C. for 2 hours, and was washed with a deionized water and dried to obtain a sulfuric acid-treated montmorillonite.

Thereafter, 20 g of the montmorillonite thus treated was placed in a 1 l flask, and was dispersed in 400 ml of a deionized water having 20 g of $Zr(SO_4)_2 \cdot 4H_2O$ dissolved and was stirred at 90° C. for 3 hours. After this treatment, the solid component thus obtained was washed with a deionized water and was dried to obtain a chemically treated montmorillonite.

(2) Preparation of catalyst component

The chemically treated montmorillonite obtained in the above step (1) was heat-dehydrated in the same manner as in Example 31(2). Thereafter, 3.0 g of the heat-dehydrated montmorillonite was placed in a 100 ml flask, and a catalyst component was prepared in the same manner as in Example 31(3).

(3) Copolymerization of ethylene-butene

Copolymerization of ethylene-butene was conducted in the same manner as in Example 31(4), except that 50.0 mg of the catalyst component obtained in the above step (2) was used. As this result, the amount of the ethylene-butene copolymer thus produced was 176 g, and this copolymer had a MI value of 0.78 g/10 minutes, a density of 0.914 g/cm³ and a MT value of 9.3 g.

Example 34

(1) Chemical treatment and granulation of clay mineral 8 kg of a commercially available montmorillonite was pulverized by using a vibrating ball mill, and the pulverized montmorillonite was dispersed in 50 l of a deionized water having 10 kg of magnesium chloride dissolved and was stirred at 80° C. for 1 hour. The solid component thus obtained was washed with water, and was dispersed in 56 l of a 8.2% hydrochloric acid aqueous solution. The dispersion thus obtained was stirred at 90° C. for 2 hours and was washed with a deionized water. 4.6 kg of the montmorillonite thus chemically treated was formed into an aqueous slurry having a solid content concentration of 15.2%, and the slurry thus formed was spray-granulated by using a spray drier. The granule obtained by this granulation had a spherical shape.

Thereafter, 20 g of the chemically treated montmorillonite thus granulated, was further chemically treated in the same manner as in Example 32(1).

(2) Preparation of catalyst component

The chemically treated montmorillonite obtained in the above step (1) was heat-dehydrated in the same manner as in Example 31(2). Thereafter, 3.0 g of the heat-dehydrated montmorillonite was placed in a 100 ml flask, and a catalyst component was prepared in the same manner as in Example 31(3).

(3) Copolymerization of ethylene-butene

Copolymerization of ethylene-butene was conducted in the same manner as in Example 31(4), except that 100.0 mg of the catalyst component obtained in the above step (2) was used and hydrogen was charged in an amount of 0.04 mol % (hydrogen/ethylene) in a gas phase in a reactor during polymerization. As this result, the amount of the ethylene-butene copolymer thus obtained was 150 g, and the shape of a particle was spherical. The copolymer thus obtained had a MI value of 1.41 g/10 minutes, a density of 0.919 g/cm³ and a MT value of 33.1 g.

Example 35

(1) Chemical treatment

A hydrochloric acid-treated montmorillonite was obtained in the same manner as in Example 31(1) by using a commercially available montmorillonite.

5 g of the hydrochloric acid=treated montmorillonite was dispersed in 100 ml of a deionizes water having 3.11 g of $VCl_3$ dissolved, and the dispersion was stirred at 90° C. for 3 hours. After this treatment, the solid component thus obtained was washed with a deionized water and was dried to obtain a chemically treated montmorillonite.

(2) Heat-dehydration treatment 0.63 g of the chemically treated montmorillonite obtained in the above step (1) was heat-dehydrated at 200° C. for 2 hours under a reduced pressure. By this treatment, the weight of the montmorillonite thus treated was reduced by 0.04 g.

(3) Preparation of catalyst 2.9 ml of toluene was added to the above obtained heat-dehydrated montmorillonite to form a slurry, and 1.2 ml of triethylaluminum/toluene solution (1.03 mmol/ml) was added to the slurry under stirring at room temperature. After contacting these components at room temperature for 1 hour, a solid part was washed with toluene. To the solid part thus washed, was added 10 ml of toluene, and was further added 2.4 ml of bis(cyclopentadienyl)zirconium dichloride/toluene solution (20.0 μmol/ml). These components were contacted at room temperature for one hour to obtain a catalyst component.

(4) Copolymerization of ethylene-butene

Copolymerization of ethylene-butene was conducted in the same manner as in Example 31(4), except that 51.7 mg of the catalyst component obtained in the above step (3) was used at 70° C. for 30 minutes.

The amount of the copolymer thus obtained was 217 g, and this copolymer had a MI value of 0.75 g/10 minutes, a density of 0.918 g/cm$^3$ and a MT value of 5.7 g.

Example 36

(1) Chemical treatment

A chemically treated montmorillonite was obtained in the same manner as in Example 35(1), except that 4.9 g of $Ti(SO_4)_2 \cdot nH_2O$ (n=4–6) was used in place of $VCl_3$.

(2) Preparation of catalyst 0.53 g of the chemically treated montmorillonite obtained in the above step (1) was heat-dehydrated in the same manner as in Example 35(2), and a catalyst component was obtained in the same manner as in Example 35(3).

(3) Copolymerization of ethylene-butene

Copolymerization of ethylene-butene was conducted in the same manner as in Example 31(4), except that 44.1 mg of the catalyst component obtained in the above step (2) was used. The amount of the copolymer thus obtained was 200 g, and this copolymer had a MI value of 1.00 g/10 minutes, a density of 0.920 g/cm$^3$ and a MT value of 5.0 g.

Example 37

(1) Chemical treatment of clay mineral 20 g of the hydrochloric acid-treated montmorillonite obtained in Example 31(1) was placed in a 1 l flask, and was dispersed in 400 ml of a deionized water having 31.8 g of $Cr(NO_3)_3 \cdot 9H_2O$ dissolved and was stirred at 90° C. for 3 hours. After this treatment, the solid component thus obtained was washed with a deionized water and was dried to obtain a chemically treated montmorillonite.

(2) Preparation of catalyst component

The chemically treated montmorillonite obtained in the above step (1) was subjected to heat-dehydration treatment in the same manner as in Example 31(2). Thereafter, 3.0 g of the heat-dehydrated montmorillonite was placed in a 100 ml flask, and a catalyst component was prepared in the same manner as in Example 32(2).

(3) Copolymerization of ethylene-butene

Copolymerization of ethylene-butene was conducted in the same manner as in Example 31(4), except that 100.0 mg of the catalyst component obtained in the above step (2) was used. As this result, the amount of the ethylene-butene copolymer thus obtained was 110 g, and this copolymer had a MI value of 0.09 g/10 minutes, a density of 0.921 g/cm$^3$ and a MT value of 25.5 g.

Example 38

(1) Chemical treatment 15 g of a commercially available synthetic hectorite was dispersed in 200 ml of a deionized water having 8.9 g of $Zr(SO_4)_2 \cdot 4H_2O$ dissolved, and was stirred at room temperature for 15 minutes and was filtrated to obtain a solid part. This operation was repeated further twice, and the solid part thus obtained was fully washed with a deionized water and was dried to obtain a chemically treated synthetic hectorite.

(2) Preparation of catalyst 1.38 g of the chemically treated synthetic hectorite obtained in the above step (1) was heat-dehydrated in the same manner as in Example 35(2), and the weight of the synthetic hectorite thus treated was reduced by 0.15 g.

4 ml of toluene was added to the hectorite thus treated to form a slurry. Thereafter, 4.9 ml of triethylaluminum/toluene solution (0.50 mmol/ml) was added to the slurry under stirring at room temperature to contact the components at room temperature for one hour, and the solid part thus obtained was washed with toluene. To the washed solid part, was added 20 ml of toluene and was further added 3.4 ml of bis(cyclopentadienyl)zirconium dichloride/toluene solution (29 μmol/ml) to contact the components at room temperature for one hour, thus obtaining a catalyst component.

(3) Copolymerization of ethylene-butene

Copolymerization of ethylene-butene was conducted in the same manner as in Example 31(4), by using 31.3 mg of the catalyst component obtained in the above step (2). The amount of the copolymer thus obtained was 27 g, and this copolymer had a MI value of 0.75 g/10 minutes, a density of 0.915 g/cm$^3$ and a MT value of 9.3 g.

Example 39

(1) Chemical treatment

A chemically treated synthetic hectorite was obtained in the same manner as in Example 38(1), except that 4.7 g of $TiCl_4$ was used in place of $Zr(SO_4)_2 \cdot 4H_2O$.

(2) Preparation of catalyst

A catalyst component was obtained by conducting heat-dehydration treatment and catalyst preparation steps in the same manner as in Example 38(2), except that 1.35 g of the chemically treated synthetic hectorite obtained in the above step (1) was used.

(3) Copolymerization of ethylene-butene

Copolymerization of ethylene-butene was conducted in the same manner as in Example 31(4), except that 33.5 mg of the catalyst component obtained in the above step (2) was used. The amount of the copolymer thus obtained was 159 g, and this copolymer had a MI value of 0.75 g/10 minutes, a density of 0.915 g/cm$^3$ and a MT value of 17.3 g.

Example 40

(1) Preparation of catalyst 1.13 g of the chemically treated synthetic mica obtained in Example 17 was heat-dehydrated in the same manner as in Example 1(2). By this treatment, the weight of the synthetic mica was reduced by 0.13 g. To the synthetic mica thus treated, was added 20 ml of toluene to form a slurry, and 2.9 ml of bis(cyclopentadienyl)zirconium dichloride/toluene solution (28 μmol/ml) was added to the slurry. The components were contacted at room temperature for one hour to obtain a catalyst component.

(2) Copolymerization of ethylene-butene

Copolymerization of ethylene-butene was conducted in the same manner as in Example 1(4), except that 26.3 mg of the catalyst component obtained in the above step (1) was used at 70° C. for 26 minutes. The amount of the copolymer thus obtained was 142 g, and the amount of the copolymer produced per g of the solid component was 5,400 g.

Example 41

(1) Preparation of catalyst

A catalyst component was prepared in the same manner as in Example 40(1), except that the chemically treated synthetic mica was used in an amount of 0.25 g and the bis(cyclopentadienyl)zirconium dichloride/toluene solution was used in an amount of 3.1 ml.

(2) Copolymerization of ethylene-butene

Copolymerization of ethylene-butene was conducted in the same manner as in Example 1(4), except that 6.0 mg of the catalyst component obtained in the above step (1) was used at 70° C. for 40 minutes. The amount of the copolymer thus obtained was 198 g, and the amount of the copolymer produced per g of the solid component was 33,000 g.

Example 42

(1) Chemical treatment 6.0 g of a commercially available montmorillonite (Aldrich: Montmorillonite K-10) was added to 1 l of a desalinated water having 64.45 g of zirconium oxychloride·$8H_2O$ ("guaranteed reagent" prepared by Wako Junyaku) dissolved to form a slurry. The slurry thus formed was stirred at 70° C. for one hour and was filtrated, and the filtrated product was washed with 500 ml of hot deionized water. Thereafter, the washed product was allowed to stand at room temperature for one night to obtain a chemically treated montmorillonite.

(2) Heat-dehydration treatment 3.00 g of the chemically treated montmorillonite obtained in the above step (1) was heat-dehydrated in the same manner as in Example 35(2). By this treatment, the weight of the montmorillonite thus treated was reduced by 0.38 g.

(3) Preparation of catalyst 10.0 mg of a commercially available bis (cyclopentadienyl)zirconium dichloride was placed in a 100 ml flask, the content of which was substituted with nitrogen. Thereafter, 10 ml of n-heptane was added thereto to form a slurry.

In another flask, was placed 1.21 g of trimethylaluminum, and 20 ml of n-heptane was added thereto. Also, the whole amount of the heat-dehydrated montmorillonite obtained in the above step (2) was placed in still another flask and 20 ml of n-heptane was added thereto to form a slurry. The above prepared trimethylaluminum solution was dropwise added to the previously prepared bis(cyclopentadienyl)zirconium dichloride slurry while vigorously stirring, and the heat-dehydrated montmorillonite slurry was then dropwise added thereto. After the dropwise addition, the resultant mixture was continuously stirred for 2 hours to obtain a catalyst component. A zirconium concentration derived from bis (cyclopentadienyl)zirconium dichloride of the slurry was 0.65 μmol/ml.

(4) Copolymerization of ethylene-propylene 300 ml of n-hexane, 0.6 ml of trimethylaluminum/toluene solution (10.18 mmol/l) and 1.0 me of the above prepared catalyst slurry were introduced in this order at room temperature into a 2 l autoclave, the content of which was previously substituted with purified nitrogen. Further, 600 ml of liquid propylene was introduced thereinto. The resultant mixture solution was heated to 70° C., and ethylene was introduced so as to make an ethylene partial pressure 17.6 kgf/cm$^2$, and polymerization was conducted for 1 hour. Thereafter, the supplying of ethylene was stopped, and polymerization was terminated by introducing ethanol. As this result, 215 g of ethylene-propylene copolymer was obtained. The amount of the copolymer produced per g of zirconium derived from bis(clopentadienyl)zirconium dichloride was $3.6 \times 10^6$ g. Also, the amount of the copolymer produced per g of aluminum derived from trimethylaluminum was 23,700 g.

Example 43

840 ml of n-hexane, 0.1 mmol of triethylaluminum and 160 ml of 1-butene were placed in a 2 l autoclave, and were heated to 70° C. Thereafter, 10 mg of the heat-dehydrated catalyst component obtained in Example 17 and 3 ml of bis(cyclopentadienyl)zirconium dichloride/toluene solution (1 μmol/ml) were introduced together with ethylene thereinto to maintain the total pressure at 25 kg/cm$^2$, thereby conducting polymerization at 70° C. for 25 minutes. After 25 minutes, ethanol was added to terminate the polymerization. The amount of the ethylene-butene copolymer thus obtained was 198 g. Also, the amount of the copolymer produced per g of the solid catalyst component was 19,800 g.

Comparative Example 1

(1) Preparation of catalyst

A catalyst component was prepared in the same manner as in Example 42(3), except that 3.00 g of the chemically treated montmorillonite (water content=12.7% by weight) obtained in Example 42(1) was used in place of the heat-dehydrated product obtained in Example 42(3). In this case, when the montmorillonite slurry was dropwise added, heat was generated together with generation of gas.

(2) Copolymerization of ethylene-propylene

Copolymerization of ethylene-propylene was conducted in the same manner as in Example 42(4), except that 3.0 ml of the catalyst slurry obtained in the above step (1) and 1.9 ml of trimethylaluminum/toluene solution (10.18 mmol/l) were used. As this result, 217 g of ethylene-propylene copolymer was obtained. The amount of the copolymer produced per g of zirconium derived from bis (cyclopentadienyl)zirconium dichloride was $1.2 \times 10^6$ g. Also, the amount of the copolymer produced per g of aluminum derived from trimethylaluminum was 8,300 g.

Comparative Example 2

A catalyst component was obtained in the same manner as in Examples 24 to 26, except that granulated montmorillonite of Examples 24 to 26 adjusted so as to have a water content of 6.5% by weight was used.

Copolymerization of ethylene-butene was conducted in the same manner as in Examples 24 to 26 by using the above prepared catalyst component. The amount of the copolymer thus obtained was 8.8 g, and the amount of the copolymer produced per g of the solid catalyst component was 220 g.

Comparative Example 3

(1) Chemical treatment 15 g of a commercially available synthetic mica was dispersed in 200 ml of a deionized water having 1.3 g of KCl dissolved, and the dispersion was stirred at room temperature for 30 minutes and was filtrated to obtain a solid part. This operation was repeated once more, and the solid part was fully washed with a deionized water and was dried to obtain a chemically treated synthetic mica.

(2) Preparation of catalyst 1.23 g of the chemically treated synthetic mica obtained in the above step (1) was heat-dehydrated in the same manner as in Example 1(2). By this treatment, the weight of the synthetic mica was reduced by 0.004 g.

10 ml of toluene was added to the heat-dehydrated synthetic mica to form a slurry, and 2.5 ml of triethylaluminum/toluene solution (1.0 mmol/ml) was added thereto to contact the components at room temperature for 1 hour. Thereafter, the solid component was washed with toluene.

20 ml of toluene was then added to the washed solid component, and 3.5 ml of bis(cyclopentadienyl)zirconium dichloride/toluene solution (28 μmol/ml) was added thereto to contact the components at room temperature for 1 hour, thereby obtaining a catalyst component.

(3) Copolymerization of ethylene-butene

Copolymerization of ethylene-butene was conducted in the same manner as in Example 1(4), except that 45.6 mg of the catalyst component obtained in the above step (2) was used. The amount of the copolymer thus obtained was 2.5 g, and the amount of the copolymer produced per g of the solid catalyst component was 55 g.

Comparative Example 4

(1) Chemical treatment of clay mineral 38 g of a commercially available montmorillonite ("Kunipia F" prepared by Kunimine Kogyo K. K.) was pulverized by using a vibrating ball mill for 4 hours.

38 g of the pulverized montmorillonite was placed in a 500 ml four-necked flask, and 240 ml of a 11.5% hydrochloric acid aqueous solution was added thereto, and the contents were heated for 6 hours under refluxing while stirring. After the treatment, the contents were washed with water until the liquid part becomes neutral, and were dried to obtain a chemically treated montmorillonite.

(2) Preparation of catalyst 3.35 g of the chemically treated montmorillonite (water content: 10.2% by weight) obtained in the above step (1) was placed in a 100 ml four-necked flask, and was dispersed in 25 ml of toluene to form a slurry.

On the other hand, 25 ml of toluene and 37.1 mmol of trimethylaluminum were placed in another 100 ml four-necked flask, and the whole amount of the above prepared slurry was dropwise added thereto at room temperature for 10 minutes under stirring. After the dropwise addition, the contents were reacted at room temperature for 0.5 hour and further reacted at 100° C. for 1 hour. Thereafter, the supernatant liquid was withdrawn to obtain a solid component, which was then washed with toluene.

The solid component thus obtained was contacted with 31 ml of toluene and 15 ml of bis(cyclopentadienyl)zirconium dichloride/toluene solution (18.7 μmol/ml) added thereto at room temperature for 1 hour. Thereafter, the supernatant liquid was withdrawn to obtain a solid component which was then washed with toluene.

(3) Copolymerization of ethylene-butene 740 ml of n-hexane, 0.1 mmol of triethylaluminum and 160 ml of 1-butene were added to a 2 l autoclave, and were heated to 70° C. Thereafter, 95 mg of the solid catalyst component obtained in the above step (2) was introduced together with ethylene thereinto to maintain the total pressure at 25.5 kg/cm², and polymerization was conducted at 70° C. for 1 hour. After 1 hour, ethanol was added to terminate the polymerization. The amount of the ethylene-butene copolymer thus obtained was 38 g, and the amount of the copolymer produced per g of the solid catalyst component was 400 g.

Comparative Example 5

(1) Chemical treatment of clay mineral 50 g of a commercially available montmorillonite ("Kunipia F" prepared by Kunimine Kogyo K. K.) was placed in a 500 ml four-necked flask, and 300 ml of a desalinated water having 40 g of $MgCl_2.6H_2O$ dissolved was added thereto, and the mixture was treated at 90° C. for 1 hour under stirring. After the treatment, a solid treatment was washed with water. This treatment operation was repeated further once to obtain a $MgCl_2$-treated montmorillonite. The montmorillonite thus treated was dried, and was pulverized for 4 hours by using a vibrating ball mill. The pulverized montmorillonite was used as a chemically treated montmorillonite.

(2) Preparation of catalyst 2.68 g of montmorillonite (water content: 13.9% by weight) treated with $MgCl_2$ and pulverized in the above step (1) was placed in a 100 ml four-necked flask, and was dispersed in 20 ml of toluene to form a slurry.

On the other hand, 20 ml of toluene and 37.3 mmol of trimethylaluminum were placed in another 100 ml four-forked flask, and the whole amount of the above prepared slurry was dropwise added thereto at room temperature for 10 minutes. After the dropwise addition, the mixture was reacted at room temperature for 0.5 hour and further at 100° C. for 1 hour, and the supernatant liquid was withdrawn to obtain a solid part, which was then washed with toluene. The solid part thus obtained was contacted with 20 ml of toluene and 6.5 ml of bis(cyclopentadienyl)zirconium dichloride/toluene solution (28.9 μmol/ml) at room temperature for 1 hour. Thereafter, the supernatant liquid was withdrawn to obtain a solid component, which was then washed with toluene.

(3) Copolymerization of ethylene-butene

Copolymerization of ethylene-butene was conducted in the same manner as in Comparative Example 4(3), except that 95 mg of the solid catalyst component obtained in the above step (2) was used. The amount of the ethylene-butene copolymer thus obtained was 14 g, and the amount of the copolymer produced per g of the solid catalyst component was 150 g.

Comparative Example 6

(1) Preparation of catalyst 12.4 g of granulated montmorillonite obtained in Example 23(1) before subjecting to heat-dehydration treatment was placed in a 500 ml four-necked flask, and was dried at room temperature for 3 hour under a reduced pressure. By this treatment, the weight of the granulated montmorillonite was reduced by 0.58 g. The granulated montmorillonite thus treated had a water content of 5.6% by weight (this amount was determined on the basis of the weight reduction caused when subjected to heat-dehydration treatment at 200° C. for 2 hours).

10 g of the above obtained water-containing montmorillonite was placed in a 500 ml four-necked flask, and 29 ml of toluene was added thereto, and the mixture was heated to 70° C. under stirring. Thereafter, 7.9 ml of triethylaluminum/toluene solution (3.94 mmol/ml) was dropwise added thereto at 70° C. for 5 minutes. After the dropwise addition, the mixture was reacted at 70° C. for one hour, and the supernatant liquid was withdrawn to obtain a solid component, which was washed with toluene. Toluene was further added to the washed solid component to form a slurry.

11 ml of the toluene slurry (solid component: 0.94 g) was placed in a 100 ml four-necked flask, and 2.2 ml of bis (cyclopentadienyl)zirconium dichloride/toluene solution (35.3 μmol/ml) was added thereto at room temperature under stirring to contact the components at room temperature for 1 hour. Thereafter, the supernatant liquid was withdrawn to obtain a solid component, which was then washed with toluene.

(2) Copolymerization of ethylene-butene

Copolymerization of ethylene-butene was conducted in the same manner as in Example 23(4), except that 76 mg of the solid catalyst component obtained in the above step (1) was used. The amount of the ethylene-butene copolymer thus obtained was 160 g, and the amount of the copolymer produced per g of the solid catalyst component was 2,100 g.

Comparative Example 7

(1) Preparation of catalyst 50 g of a commercially available montmorillonite was pulverized for 6 hours by using a vibrating ball mill. 1.49 g of the pulverized montmorillonite was placed in a 100 ml flask, and was subjected to heat-dehydration treatment at 200° C. for 2 hours under a reduced pressure. By this treatment, the weight of the pulverized montmorillonite was reduced by 0.20 g. To the montmorillonite thus treated, was added 10 ml of toluene to form a slurry. Thereafter, 2.6 mmol of triethylaluminum was added to the slurry at room temperature under stirring to contact the components at room temperature for 30 minutes. Thereafter, 5.9 ml of bis(cyclopentadienyl)zirconium dichloride/toluene solution (35 μmol/ml) was added thereto. After contacting the components at room temperature for 5 minutes, ethylene was flown therethrough at room temperature for 1 hour. After stopping the flowing of ethylene, the supernatant liquid was withdrawn to obtain a solid component, which was then washed with toluene. The solid component thus obtained contained 0.16 g of ethylene polymer per g of clay mineral.

(2) Copolymerization of ethylene-butene

Copolymerization of ethylene-butene was conducted in the same manner as in Example 23(4), except that 61.5 mg (weight excluding the polymer) of the solid component obtained in the above step (1) was used. The amount of the copolymer thus obtained was 1.7 g, and the amount of the copolymer produced per g of the solid component was 28 g.

As mentioned above, the catalyst of the present invention and the polymerization method using the same provide an extremely high polymerization activity per not only a transition metal and Al but also a solid component in olefin polymerization, and it is not necessary to remove a catalyst residue from a polymer produced. Thus, they are industrially very useful, and moreover a polymer produced by the polymerization method of the present invention is excellent in melt tension, thus remarkably improving moldability of the polymer.

We claim:

1. A catalyst for polymerizing an olefin, which comprises:

(A) a metallocene transition metal compound, (B) at least one member selected from the group consisting of (1) an ion-exchanging layered compound other than a silicate and (2) an inorganic silicate prepared by treating a starting ion-exchanging layered compound other than a silicate or a starting silicate with a salt, an acid or combination thereof, said component (B) having a water content not higher than 1% by wt which is obtained by heat-dehydrating component (B) under an inert gas atmosphere or under reduced pressure, and (C) an organoaluminum compound.

2. The catalyst according to claim 1 wherein said treatment is a salt treatment.

3. The catalyst recording to claim 1, wherein said treatment is a combination of a salt treatment and an acid treatment.

4. The catalyst according to claim 3, wherein component (B), prior to acid or salt treatment contains at least 0.1% by wt of an exchangeable metal cation of Group 1 of the Periodic Table.

5. The catalyst according to claim 4, wherein the amount of said exchangeable metal cation is at least 0.5% by wt.

6. The catalyst according to claim 4, wherein the component (B) before being subjected to the salt and acid treatments has at least 40% by weight of the exchangeable Group 1 metal cation ion-exchanged with a cation of at least one atom selected from the group consisting of Groups 2–14 atoms of the Periodic Table.

7. The catalyst according to claim 6, wherein at least 60% by wt of the exchangeable Group 1 metal cation is ion-exchanged.

8. The catalyst according to claim 1, wherein the salt of the salt-treatment is a water-soluble compound or an acidic aqueous solution-soluble compound, whose cation component is a cation of at least one atom selected from the group consisting of atoms of Groups 2–14 of the Periodic Table and whose anion component is a halide or the conjugate base of an inorganic acid or an organic acid or a combination thereof.

9. The catalyst according to claim 8, wherein the halide or conjugate base is selected from the group consisting of Cl$^-$, Br$^-$, I$^-$, F$^-$, PO$_4^{3-}$, SO$_4^{2-}$, NO$_3^-$, CO$_3^{2-}$, C$_2$O$_4^{2-}$, ClO$_4^-$, OOCCH$_3^-$, CH$_3$COCHCOCH$_3^-$, OCl$_2^-$, O(NO$_3$)$_2^-$, O(ClO$_4$)$_2^{2-}$, O(SO$_4$)$^{2-}$, OH$^-$, O$_2$Cl$_2^{2-}$, OCl$_3^-$, OOCH$^-$, OOCCH$_2$CH$_3^-$, and C$_6$H$_5$O$_7^{-3}$.

10. The catalyst according to claim 1, wherein the acid of said acid treatment is an inorganic acid.

11. The catalyst according to claim 1, wherein the component (A) is an organometallic compound comprising a cyclopentadienyl ring-containing ligand and a metal of Group 3, 4, 5 or 6 of the Periodic Table.

12. The catalyst according to claim 1, wherein the component (A) is a compound of the formula (1) or (2):

$$(C_5R^1_aH_{5-a})_p(C_5R^2_bH_{5-b})_qMR^3 \qquad (1)$$

$$[(C_5R^1_aH_{5-a})_p(C_5R^2_bH_{5-b})_qMr^3_rL_m]^{r+}[R^4]_s^{t-} \qquad (2)$$

wherein $C_5R^1_aH_{5-a}$ and $C_5R^2_bH_{5-b}$ are cyclopentadienyl group derivatives, wherein each of R$^1$ and R$^2$, which may be the same or different, is a C$_{1-20}$ hydrocarbon group, optionally substituted by halogen; a silicon-containing group; a phosphorus-containing group; a nitrogen-containing group or an oxygen-containing group; a and b are each 0 or an integer of 1–5 and (s×t=n), wherein s=1, 2 or 3;

R$^3$ is a C$_{1-20}$ hydrocarbon group, optionally substituted by halogen, hydrogen; a silicon-containing group; an alkoxy group; an aryloxy group; an amide group or a thiolate group;

M is an atom of Group 3, 4, 5 or 6 of the Periodic Table;

L is an electrically neutral Lewis base ligand and m is 0 or an integer greater than 0 which indicates the number of the Lewis base ligands;

[R⁴]ᵗ⁻ is at least one anion; and p, q and r are 0 or positive integers which satisfy the equation, p+q+r=V (V=the valence of M), in the event that component (A) is a metallocene transition metal compound of the formula (1), or p, q and r are 0 or positive integers which satisfy the equation, p+q+r=V−n, in the event that component (A) is a metallocene transition metal compound of the formula (2).

13. The catalyst according to claim 12, wherein M in the formula (1) or (2) is titanium, zirconium or hafnium.

14. The catalyst according to claim 1, wherein the component (C) is a compound of the formula, $$AlR^6_j X_{3-j}$$

wherein $R^6$ is a $C_{1-20}$ hydrocarbon group, X is hydrogen, halogen or an alkoxy group, and j is an integer which satisfies $0<j\leq 3$.

15. The catalyst according to claim 1, wherein the component (A) is a compound of the formula (1) or (2):

$$(C_5R^1_a H_{5-a})_p(C_5R^2_b H_{5-b})_q MR^3_r \quad (1)$$

$$[(C_5R^1_a H_{5-a})_p(C_5R^2_b H_{5-b})_q MR^3_r L_m]^{r+}[R^4]_s^{t-} \quad (2)$$

wherein $C_5R^1_a H_{5-a}$ and $C_5R^2_b H_{5-b}$ are cyclopentadienyl group derivatives, wherein each of $R^1$ and $R^2$, which may be the same or different, is a $C_{1-20}$ hydrocarbon group, optionally substituted by halogen; a silicon-containing group; a phosphorus-containing group; a nitrogen-containing group or an oxygen-containing group, a and b are each 0 or an integer of 1–5 and (s×t=n), wherein s=1, 2 or 3;

$R^3$ is a $C_{1-20}$ hydrocarbon group, optionally substituted by halogen; hydrogen; halogen, a silicon-containing group, an alkoxy group, an aryloxy group, an amide group or a thiolate group;

M is an atom of Group 3, 4, 5 or 6 of the Periodic Table;

L is an electrically neutral Lewis base ligand and m is 0 or an integer greater than 0 which indicates the number of the Lewis base ligands;

[R⁴]ᵗ⁻ is at least one anion; and p, q and r are 0 or positive integers which satisfy the equation, p+q+r=V (V=the valence of M), in the event that component (A) is a metallocene transition metal compound of the formula (1), or p, q and r are 0 or positive integers which satisfy the equation, p+q+r=V−n, in the event that component (A) is a metallocene transition metal compound of the formula (2), and the component (C) is a compound of the formula, $$AlR^6_j X_{3-j}$$

wherein $R^6$ is a $C_{1-20}$ hydrocarbon group, X is hydrogen, halogen or an alkoxy group, and j is an integer which satisfies $0<j\leq 3$.

* * * * *